(12) United States Patent
Loucks

(10) Patent No.: US 12,419,342 B2
(45) Date of Patent: Sep. 23, 2025

(54) ROLLING PAPER PICK AND PLACE APPARATUS

(71) Applicant: Kyle Loucks, Vancouver, WA (US)

(72) Inventor: Kyle Loucks, Vancouver, WA (US)

(73) Assignee: ROLLPROS LLC, Vancouver, WA (US)

( * ) Notice: Subject to any disclaimer, the term of this patent is extended or adjusted under 35 U.S.C. 154(b) by 0 days.

(21) Appl. No.: 18/760,301

(22) Filed: Jul. 1, 2024

(65) Prior Publication Data

US 2024/0349777 A1 Oct. 24, 2024

Related U.S. Application Data

(63) Continuation of application No. 17/468,566, filed on Sep. 7, 2021, now Pat. No. 12,035,743, which is a
(Continued)

(51) Int. Cl.
*A24C 5/10* (2006.01)
*A24C 5/12* (2006.01)
(Continued)

(52) U.S. Cl.
CPC ............... *A24C 5/10* (2013.01); *A24C 5/12* (2013.01); *A24C 5/46* (2013.01); *G01G 13/006* (2013.01); *G01G 13/22* (2013.01); *G01G 13/28* (2013.01)

(58) Field of Classification Search
CPC .... A24C 5/10; A24C 5/12; A24C 5/46; A24C 5/08; A24C 5/14; A24C 5/47; A24C 5/18;
(Continued)

(56) References Cited

U.S. PATENT DOCUMENTS 411,919 A 10/1889 Hagen
2,100,315 A 11/1937 Harper
(Continued)

FOREIGN PATENT DOCUMENTS

BE 0446651 A 8/1942
CN 104305520 A 1/2015
(Continued)

OTHER PUBLICATIONS

Decision on Rejection issued in CN Application No. 202080072322.0, issued on Nov. 29, 2023.
(Continued)

*Primary Examiner* — Jacques M Saint Surin
(74) *Attorney, Agent, or Firm* — DILWORTH IP, LLC

(57) ABSTRACT

A cigarette rolling machine includes paper pick and place subassembly wherein bulk paper strip is provided by a roll resting upon spool hooks. The frame plates are held spaced apart by a plurality of struts. A paper drive motor drives a roller which may preferably be made of polyurethane or another material that paper may adhere to effectively. A fluid reservoir contains adhesive fluid which is delivered into a wick held in a wick retainer A pick arm mounted on vertical displacement struts raises and lowers a hollow pick manifold connected to a vacuum line so that it may pick up a cigarette paper and retain it on its underside surface for placement onto a section cigarette forming belt. A transfer pad swings from a pair of swing arms which each have a stud slidable within a serpentine groove of a guide plate affixed to the pick manifold.

20 Claims, 15 Drawing Sheets

Related U.S. Application Data continuation-in-part of application No. PCT/US2020/055961, filed on Oct. 16, 2020.

(60) Provisional application No. 62/923,510, filed on Oct. 19, 2019.

(51) Int. Cl.
*A24C 5/46* (2006.01)
*G01G 13/00* (2006.01)
*G01G 13/22* (2006.01)
*G01G 13/28* (2006.01)

(58) Field of Classification Search
CPC . A24C 5/39; A24C 5/44; G01G 13/82; G01G 13/22; G01G 13/006
USPC .......................................................... 177/116
See application file for complete search history.

(56) References Cited

U.S. PATENT DOCUMENTS

| | | | |
|---|---|---|---|
| 2,269,432 A | 1/1942 | Beck et al. | |
| 2,436,015 A | 2/1948 | Morris et al. | |
| 2,572,193 A | 10/1951 | Phillips et al. | |
| 2,740,408 A | 4/1956 | Brown et al. | |
| 3,911,933 A | 10/1975 | Crisp et al. | |
| 4,277,851 A * | 7/1981 | Choyce | A61F 2/16 623/6.43 |
| 4,368,741 A | 1/1983 | Meinunger | |
| 4,867,180 A | 9/1989 | Brackmann et al. | |
| 4,971,077 A | 11/1990 | Dominguez et al. | |
| 5,513,697 A | 5/1996 | Gudmundsson | |
| 5,697,327 A | 12/1997 | Pollock | |
| 6,062,794 A * | 5/2000 | Shiba | B65H 19/12 414/277 |
| 7,275,478 B2 * | 10/2007 | Ikuta | B65B 3/32 99/348 |
| 7,341,170 B2 * | 3/2008 | Boone | B65H 35/10 225/10 |
| 7,479,098 B2 * | 1/2009 | Thomas | B31F 1/0051 493/39 |
| 7,638,008 B2 * | 12/2009 | Hamrick | B32B 37/0053 156/331.7 |
| 8,550,523 B2 * | 10/2013 | Rachkov | H05K 13/0413 294/185 |
| 9,038,641 B2 * | 5/2015 | Moser | A24C 5/42 131/70 |
| 10,850,874 B2 * | 12/2020 | Boldrini | B65B 3/28 |
| 11,059,683 B1 | 7/2021 | Prins | |
| 11,129,407 B2 * | 9/2021 | Loucks | A24C 5/46 |
| 2008/0006284 A1 | 1/2008 | Barnes et al. | |
| 2022/0264934 A1 * | 8/2022 | Kang | A24D 1/18 |
| 2024/0315313 A1 * | 9/2024 | Jin | A24C 5/44 |

FOREIGN PATENT DOCUMENTS

| | | |
|---|---|---|
| CN | 106115295 A | 11/2016 |
| FR | 0934651 A | 5/1948 |
| GB | 1273686 | 5/1972 |
| WO | 91/11120 A1 | 8/1991 |
| WO | WO-2021076877 A1 * | 4/2021 ............... A24C 5/08 |

OTHER PUBLICATIONS

Decision to grant a European patent received for European Application No. 20876837.4 mailed on Jul. 25, 2024, 2 pages.

Extended European Search Report and Search Opinion received for European Application No. 20876837.4, mailed on Jul. 24, 2023, 5 pages.

Intention to Grant received for European Application No. 20876837.4, mailed on Mar. 21, 2024, 6 pages.

International Search Report and Written Opinion received for PCT Patent Application No. PCT/US2020/055961, mailed on Feb. 2, 2021, 6 pages.

* cited by examiner

ROLLING PAPER PICK AND PLACE APPARATUS

CROSS REFERENCE TO RELATED APPLICATIONS

This application is a continuation of, claims the benefit of, and claims priority to U.S. utility patent application Ser. No. 17/468,566 "Cigarette Rolling Machine," filed 7 Sep. 2021.

U.S. utility patent application Ser. No. 17/468,566 "Metered Material Feeder," filed 7 Sep. 2021, now U.S. Pat. No. 12,035,743, issued on 16 Jul. 2024, claims the benefit of and priority to Patent Cooperation Treaty (PCT) application serial PCT/US20/055961 "Cigarette Rolling Machine," filed 16 Oct. 2020. PCT application Serial No. PCT/US20/055961 "Cigarette Rolling Machine," filed 16 Oct. 2020, claims the benefit of U.S. Provisional Patent Application Ser. No. 62/923,510 "Cigarette Rolling Machine," filed 19 Oct. 2019.

The entire contents of Provisional Patent Application 62/923,510 "Cigarette Rolling Machine," filed 19 Oct. 2019, PCT application PCT/US20/055961 "Cigarette Rolling Machine," filed 16 Oct. 2020, and U.S. utility patent application Ser. No. 17/468,566 "Metered Material Feeder," filed 7 Sep. 2021 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to machinery for capturing smoking material into a convenient paper tube optionally including a filter element in one end of the tube.

BACKGROUND

People who smoke tobacco and other legal smoking materials enjoy having the material provided for them encapsulated in a paper tube as a cigarette, optionally including a filter element installed in one end of the tube. Rolling cigars and cigarettes is a labor intensive and sometimes delicate activity, especially since smokers prefer that sets of cigarettes are formed to identical diameters and lengths. Inventors of machines to facilitate or automate some or many steps in a cigarette forming process are challenged to create effective means and controllable processes to produce paper tube cigarettes to precise diameter and length dimensions.

BRIEF DESCRIPTION

A primary objective of the invention is to provide an automated, machine-operated process for metering uniform charges of smoking materials and encapsulating them in paper tubes optionally including a filter incorporated in one end of the tube. A corollary objective of the invention is to repeatably produce paper tube cigarettes to precise and uniform diameter and length dimensions, and yet another corollary objective is that these dimensions are each adjustable within a production range.

Another corollary objective of the invention is to produce paper tubes from a lower-cost bulk supply or spool of paper strip, rather than handling individual wrapping papers which are more costly and more difficult to manipulate by machine.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 1b shows a top, right, front isometric view of the embodiment of the cigarette rolling machine of FIG. 1a.

FIG. 1c shows a front view of the embodiment of the cigarette rolling machine of FIG. 1a.

DETAILED DESCRIPTION of CERTAIN EMBODIMENTS

Figure 1A:
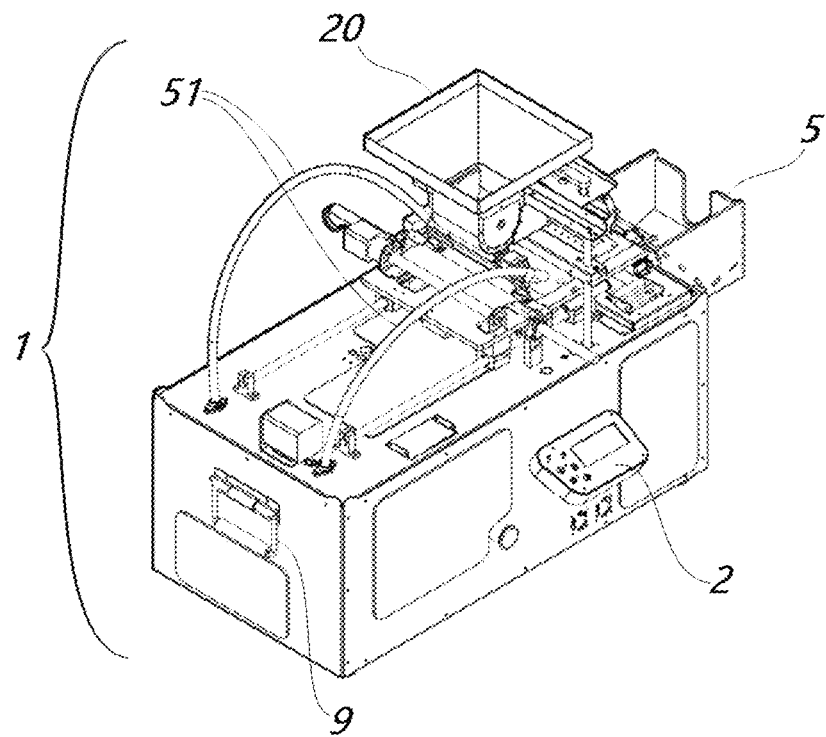
FIG. 1a shows a top, left, front isometric view of an embodiment of a cigarette rolling machine in accordance with the invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Also in this specification, the word "substantially" when modifying words which indicate relative angular orientation, for example "A is substantially perpendicular to B" shall mean that A is within 15° of a theoretical perpendicular direction with respect to B." When modifying scalar or linear dimensions or extensions, an example phrase such as "C is substantially the same length as D" shall mean that length D is greater than or equal to 83% of length C, and less than or equal to 117% of length C.

The invention is a cigarette rolling machine deposits uniformly metered charges of smoking material into a trough formed in a belt as dispensed from a bulk supply. Uniform metering may be controlled by volume or mass. A length of smoking paper sufficient for the combined length of two cigarettes is deposited nearby on the belt on a movable platen. As the platen moves, the belt glides over a fixed arbor and at least two movable arbors, and the belt forms into a bight, rolling the material into a cylindrical volume. Filters are delivered and abutted to the ends of the volume and the smoking paper is entrained into the bight to encircle the smoking material and filters. A pre-moisten adhesive along a leading edge of the paper adheres to its trailing edge as a circular ouroboros and forming a tube. The twinned pair of cigarettes is then drawn across a cutting plane knife and parted into two individual cigarettes. In summary, the invention includes a process of making cigarettes comprising: taking a weighed out volume of cannabis, then compressing it radially in a rolling motion, then adding in filters at the ends of the rolled mass of smoking material, rolling a cigarette paper around the mass and the filters to form a twinned pair of cigarettes, and then cutting the twinned pair into two pieces.

Using an embodiment of a cigarette rolling machine as described in this specification, a preferred process for forming pairs of cigarettes comprises the steps of:

a. providing a cigarette forming machine having a stationary frame supporting a horizontal first arbor, a movable frame adapted for lateral translation perpendicular to the first arbor, a platen affixed to the movable frame and disposed beneath the first arbor, with the platen having a surface with a first edge opposite from a second edge, and a forming belt having a first end secured to the platen at said first edge of said platen. The forming belt passes over the first arbor and has a second end secured to a second arbor mounted to the movable frame, laterally spaced apart from the first arbor, with a forming belt indenter placed between the first arbor and the second edge of said platen.

b. The movable frame then translates so that as the forming belt indenter descends and passes between the first arbor and the second edge of the platen, a trough is formed in the forming belt.

c. An amount of smoking material sufficient for two cigarettes is then deposited into the trough.

d. The indenter then rises clear of the platen.

e. The movable frame then translates so that the second edge of the platen passes beneath the first arbor, and the trough in the forming belt becomes pinched, and the belt forms a rolling volume about the smoking material.

f. A cigarette paper is then deposited onto the forming belt, with the cigarette paper being wider than the circumference of a finished cigarette and having a length at least equal to twice the length of a finished cigarette.

g. Lastly, the moveable frame translates back, so that the second arbor passes beneath said first arbor. The pinched off section of belt opens and disgorges a twinned pair of cigarettes.

Figure 1B:
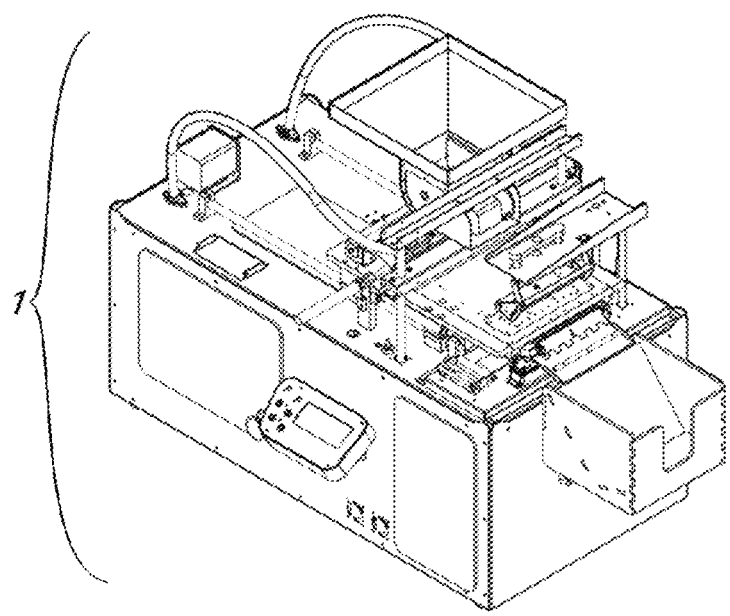

Referring now to the figures, FIG. 1a shows a top, left, front isometric view of an embodiment of a cigarette rolling machine [1] in accordance with the invention. The machine includes a control panel [2] with a status display, a hopper [20] for receiving bulk quantities of smoking material to be metered out into charges of constant and repeatable mass, a hopper [5] for collecting finished cigarettes, and also visible are two filter delivery tubes [51] for optionally delivering filters to be incorporated into one end of each cigarette, and one of two carrying handles [9.] for transporting or positioning the machine in a production work space. FIG. 1b shows a top, right, front isometric view of the embodiment of the cigarette rolling machine [1] of FIG. 1a.

Figure 1C:
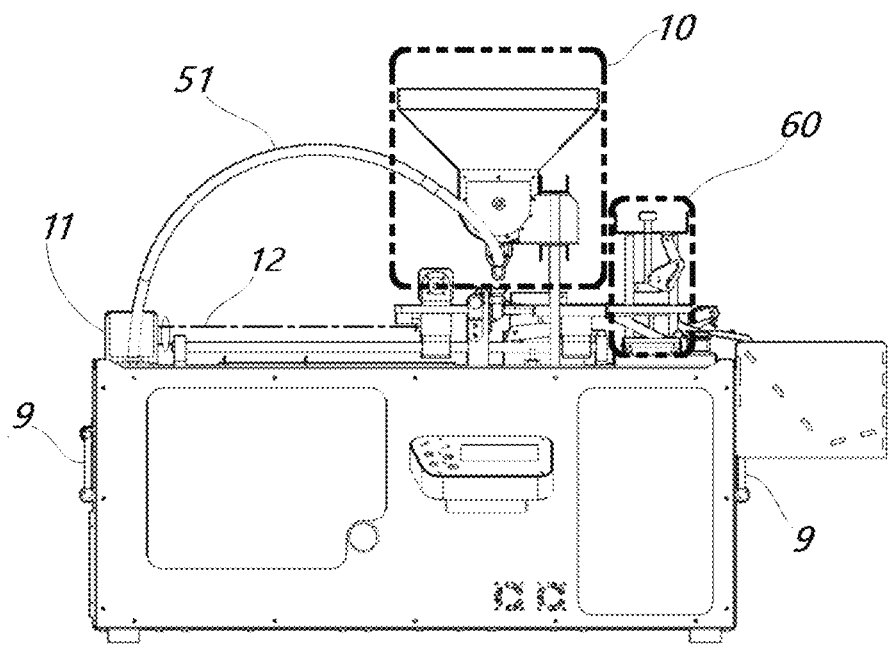

FIG. 1c shows a front view of the embodiment of the cigarette rolling machine of FIG. 1a. The machine in this embodiment has two carrying handles [9] located on the longitudinal end faces of the main enclosure of the machine, although in alternate embodiments these handles may be omitted or located on other surfaces of the machine and the number of handles is not limited to two. Also seen here are the two filter delivery tubes [51] as mentions above and elsewhere in this specification. This figure also identifies two other sub-assemblies in the machine which are the dispenser subassembly [10] and the cigarette paper pick assembly [60] which will each also be described in detail below. A computer controlled stepper motor [11] drives a belt [12] or chain or silent chain to translate the platen and other components as will also be described below. Alternatively, this motor may be coupled to a threaded rod or a power screw, either directly or through a gearbox, and the components which move with the platen may be coupled to the threaded power screw for axial translation as a group.

The schematic representations shown in FIGS. 2a through 4c depict various elements of systems as graphic symbols which are to some degree abstract, rather than realistic pictures of particular components, and omitting some details that are less relevant to the key information the schematic is intended to convey. As such they may include oversimplified elements in order to make certain essential information easier to grasp. In so doing, these figures emphasize the functions of various individual elements and the interconnections among them while suppresses their particular physical details.

Also in this specification, for FIGS. 2a through 3b, terms such as "forward" or "advance" or "ahead of" indicate motion toward or direction which is leftward in these figures, and "front" or "leading edge" are used to mean leftside edges or features on various components. Similarly, "rear," "aft," "rearward" and "behind" mean rightward motions and directions or rightside edges or features on various components.

Figure 2A:
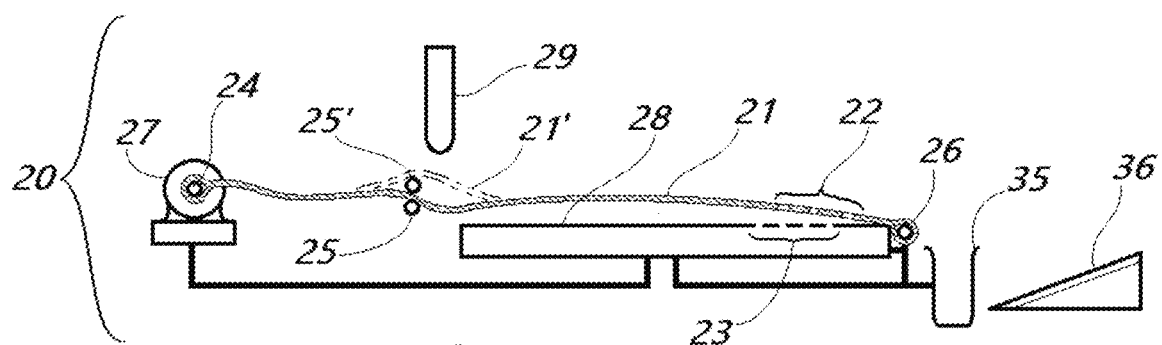
FIG. 2a shows components of a cigarette rolling subassembly of an embodiment of a cigarette rolling machine in accordance with the invention.

FIG. 2a shows components of a cigarette rolling subassembly [20] of an embodiment of a cigarette rolling machine in accordance with the invention. These elements are depicted as schematic diagram elements rather than concrete depictions of specific solid material components. A forming belt [21] extends between a tensioning spindle [24,] passing over a first pinching spindle [25] and ending at a platen spindle [26.] An optional second pinching spindle [25'] may be located over or in the immediate proximity of the first pinching spindle for additional control over the forming belt. According to the embodiment shown, the belt passes between the first and second pinching spindle, but it a preferred embodiment the belt may pass over the upper of the two pinching spindles according to the alternate section of belt path [21'] shown in phantom line.

The platen spindle attaches to the tail end of a platen [28] which is hollow or includes an internal cavity which is held at a vacuum below the prevailing atmospheric pressure. The platen includes at least one perforation communicating from the platen surface to this internal cavity. The vacuum pump and its fitting and connections to the cavity in the platen are not explicitly shown in these views. An optional tensioning motor [27] such as a computer-controlled stepper motor drives the tensioning spindle so that computer commands from belt tension sensors may be used to wind the belt around the tensioning spindle or apply holding torques at various intervals and durations during the cigarette rolling process. The forming belt includes a perforated section [22] which interoperates with perforations [23] in the platen which communicate with its vacuum cavity. The perforations need not be exactly congruent or complementary in order to function as cigarette paper retention means. Teflon coated fabric is a preferred material for the forming belt. Alternatively, the paper may be held down onto the belt using other mechanical means such as dedicated corner or edge clips which lightly restrain the paper until the cigarette is formed. An edge clip may restrain a part of or an entire length of an edge of a rolling paper.

A slitted catch basin [35] is attached abaft of the platen for receiving twinned pairs of cigarettes as these are rolled up by the forming belt and discharged. A parting knife [36] is positioned to align with the slit so that a twinned pair of cigarettes deposited into the catch basin may be parted in two when the basin translates and draws the twinned pair over the knife edge to be parted. Lastly in this figure, a forming belt indenter [29] is positioned between the first arbor and the leading edge of the platen so it may descend between the leading edge of the platen and the pinching spindle a production step of forming a trough in the belt in preparation for receiving a charge of smoking material.

Figure 2B:
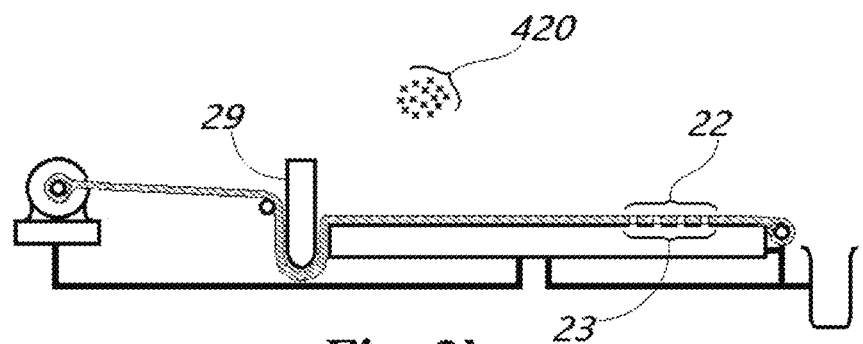
FIG. 2b shows the cigarette rolling subassembly of FIG. 2a, with an indenter forming a trough and smoking material being delivered.
Figure 2C:
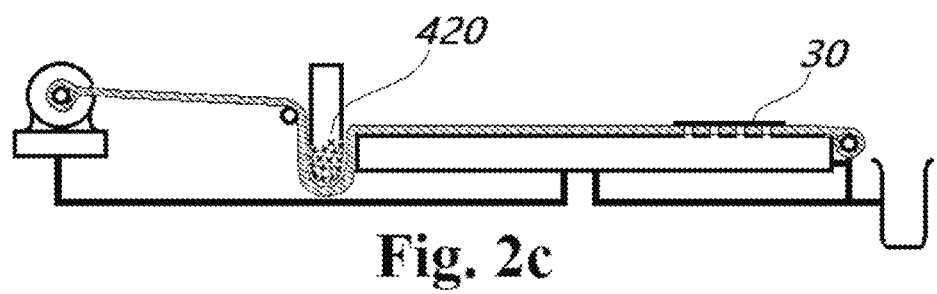
FIG. 2c shows the cigarette rolling subassembly of FIG. 2a, with the smoking material delivered to a trough formed in the belt, and a cigarette paper delivered to a porous section of the belt.

FIG. 2b shows the cigarette rolling subassembly of FIG. 2a, with the indenter [29] descending to form a trough, and a predetermined mass of smoking material [420] having being meted out to be deposited into the trough. The belt length consumed by the trough draws the rest of the length of the belt into increased tension and tautness so that the perforated section [22] of the belt is drawn down to align and cooperate with the perforations [23] in the platen which communicate with its vacuum cavity. FIG. 2c shows the cigarette rolling subassembly of FIG. 2a, with the smoking material [420] delivered to a trough formed in the belt, and a cigarette paper [30] delivered to a porous section of the belt. It is also possible to incorporate a trough-forming stage by means of a trough-shaped hollow block evacuated and perforated so that a slack section of belt may be sucked down into the hollow to create a trough, as illustrated below in FIG. 3c. Other means such as magnets within the trough attracting attractable materials in the belt or lining the trough with a tacky may be employed to temporarily conform the belt to the profile of the trough portion of the platen.

Additionally, it is also possible to deposit filters into the indented belt at his point in the manufacturing operation. Although a preferred method delivers the filters axially into the belly of the trough through tubes driven by puffs of air, it is also possible to use a pick and place device or a vacuum pick and place device to deposit them in place from above.

Figure 2D:
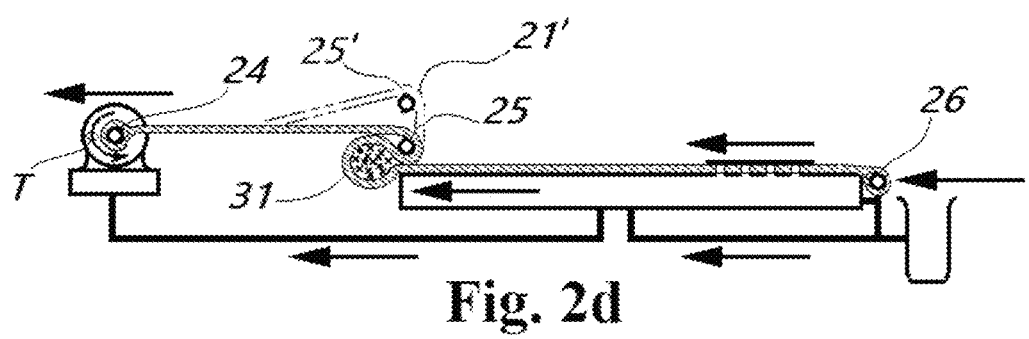
FIG. 2d shows the cigarette rolling subassembly of FIG. 2a with the platen and other components in motion so that the trough in the belt gets pinched off to define a substantially cylindrical rolling volume.

FIG. 2d shows the cigarette rolling subassembly of FIG. 2a with the platen and other components in motion shown by heavy-line arrows pointing leftward in the figure. The leading edge of the platen impinges upon the trough in the belt so that it gets pinched off to define a substantially cylindrical rolling volume [31.] The tensioning spindle [24,] tensioning motor, platen, platen spindle [26] and catch basin are all mechanically attached to each other and move leftward and rightward as a group. The pinching spindle [25] remains stationary while the previous components move leftward in this figure. The vertical distance between the upper surface of the platen and the pinching spindle (or first arbor) is preferably slightly larger than twice the thickness of the forming belt. The tensioning motor may be actuated during this step to apply torque [T] to the tensioning spindle (i.e, the second arbor) so as to develop or increase belt tension so as to control or reduce the diameter of the rolling volume and the smoking material therein. Winding the second arbor of the machine increases belt tension and reduces the volume of the smoking material. The second pinch roller [25'] and the alternate belt path [21'] described in FIG. 2a are shown here to illustrate that the upper portion of the belt may be raised above so that the topmost leftward-moving section of the belt does not rub against the rightward-moving upper section of the bight which defines the rolling volume. Keeping these two oppositely-moving sections of belt from touching each other advantageously reduces friction and the total amount of power used to operate the machine. The second pinch roller is mounted to the stationary frame of the machine and may also be called the third arbor of the invention. This arbor is also preferably located above the platen surface at a distance at least slightly larger than twice the thickness of the forming belt.

Figure 2E:
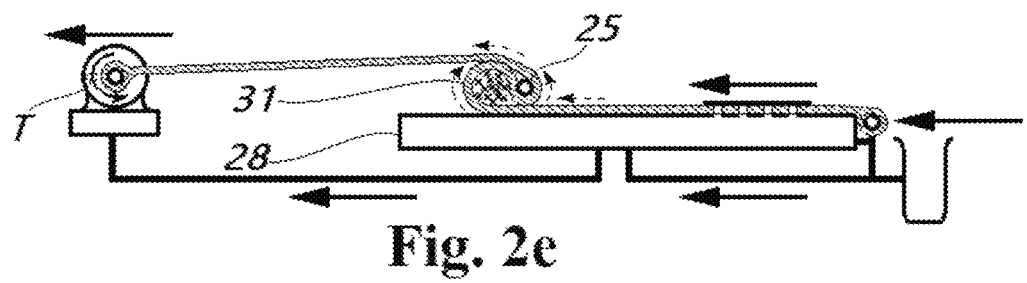
FIG. 2e shows the cigarette rolling subassembly of FIG. 2a, with the platen having passed beneath the rolling volume and having displaced it upward to slide along its upper surface.

FIG. 2e shows the cigarette rolling subassembly of FIG. 2a, with the platen [28] having passed beneath the rolling volume [31] and having displaced it upward to slide along its upper surface. The belt enters the underside of the rolling volume and works its way around the pinching spindle [25] before riding atop of itself as it is being pulled leftward by the tensioning spindle. Heavy-line arrows show the motion of the tensioning spindle and tensioning motor, and the platen, platen spindle, and catch basin. Light, broken-line arrows show the motion of the belt in the vicinity of the rolling volume. The torque applied [T] by the tensioning motor may be increased so as to compact the charge of smoking material and reduce the diameter of the rolling volume. The vacuum drawn by the cavity in the platen holds the cigarette paper as it approaches the rolling volume defined by the trough or belly formed in the forming belt.

Figure 2F:
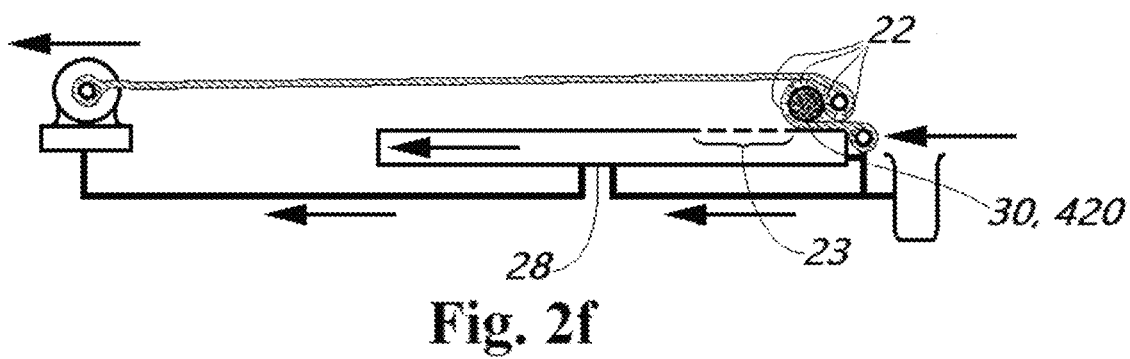
FIG. 2f shows the cigarette rolling subassembly of FIG. 2a, with the platen and belt continuing to translate so that the cigarette paper is inducted into the rolling volume.

FIG. 2f shows the cigarette rolling subassembly of FIG. 2a, with the platen [28] and belt continuing to translate so that as the perforated section [22] of the belt passes beneath the rolling volume and lifts off from the perforations [23] in the platen, the cigarette paper [30] is inducted into the rolling volume, then drawn around the periphery of the cylindrical volume and encapsulates the smoking material [420] into a paper tube. Optional filter elements are positioned at the axial ends of the cylinder of smoking material just before the step illustrated in this figure begins.

Figure 2G:
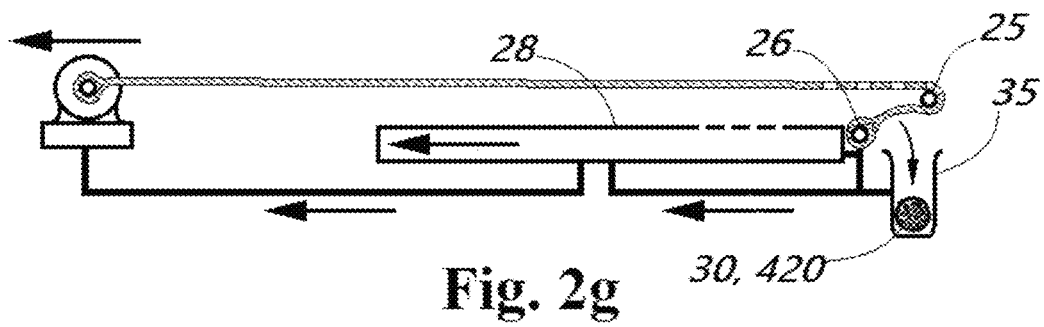
FIG. 2g shows the cigarette rolling subassembly of FIG. 2a, with the platen and belt continuing to translate so that the belt opens the rolling volume and a twinned pair of cigarettes fall into a slitted catch basin.

FIG. 2g shows the cigarette rolling subassembly of FIG. 2a, with the platen [28] and belt continuing to translate so that the belt opens the rolling volume and a twinned pair of cigarettes [30, 420] fall into a slitted catch basin [35.] The trough in the belt opens after the platen spindle [26] passes beneath and leftward of the pinching spindle [25,] reversing the trough so that it opens downward to disgorge the twinned pair of cigarettes.

Figure 2H:
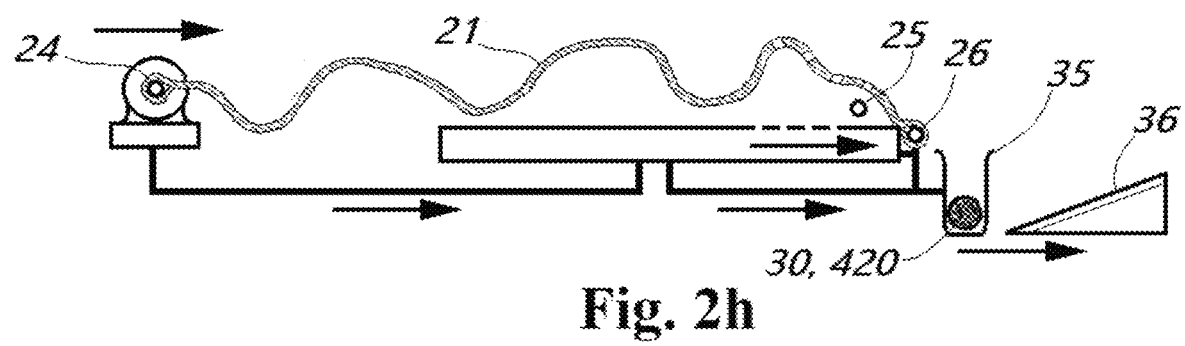
FIG. 2h shows the cigarette rolling subassembly of FIG. 2a, with the platen and its attached components returning to an initial position.

FIG. 2h shows the cigarette rolling subassembly of FIG. 2a, with the platen and its attached components, the tensioning spindle [24,] the platen spindle [26,] and the cigarette catch basin [35] returning as a group to an initial or "home" position. The forming belt [21] is not necessarily controlled in this phase, and any previous winding of the tensioning spindle may be unwound during this phase. The pinching spindle [25] remains stationary with respect to the group of moving components. The platen and the slitted catch basin continue rightward so that the slit in the moving catch basin bestrides the stationary parting knife [36] and the twinned pair of cigarettes is drawn over the inclined cutting edge of the parting knife. The parting knife incises the twinned pair at its cutting plane and bisects the twinned pair into two separate individual cigarettes. Alternatively, instead of a stationary inclined edge, the parting knife may comprise a rotary blade such as a circular blade, whereby the twinned cigarette pair is positioned over the circular blade and rotated so that the incision progresses around the complete perimeter of the paper tube to separate the conjoined pair of cigarettes. Optionally, the machine may hold the twinned pair in place while a non-stationary knife moves in to part the twinned pair at a cutting plane. The twinned pair may also be rotating within the belt at the time as well.

Another way to summarize an embodiment in accordance with the invention is that a cigarette rolling assembly comprises a stationary frame supporting a horizontal first arbor [25] a movable frame adapted for lateral translation perpendicular to the first arbor (such as the arrows in FIGS. 2d through 2h.) A platen [28] affixed to the movable frame beneath the first arbor includes a surface having a first edge opposite from a second edge, which in the figures are its left and right edges. A forming belt having a thickness has its first end secured to the first edge of said platen. The forming belt passes over the first arbor and has its second end secured to a second arbor mounted to the movable frame, and laterally spaced apart from the first arbor. The second arbor is preferably rotatable by a motor under computer control or an programmable controller, so that the belt tension may be adjusted and controlled as the cigarettes are being formed.

Figure 3A:
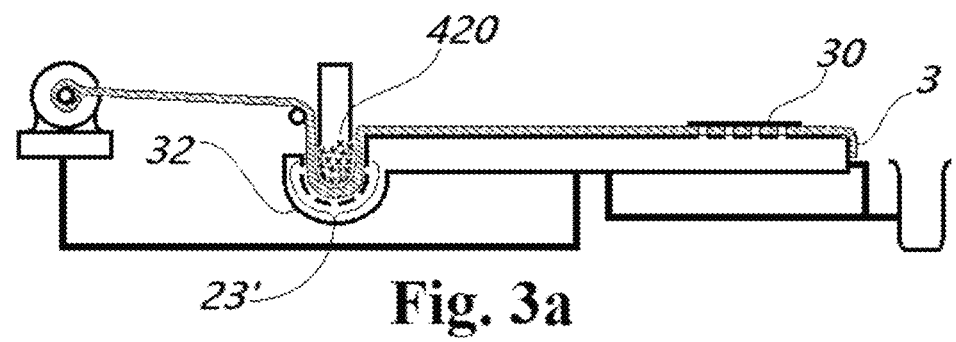
FIG. 3a shows a variant of the embodiment of a the cigarette rolling subassembly shown in FIG. 2c which includes additional suction trough that maintains the trough in the belt until the pinch-off of the rolling volume shown in FIG. 2d is established.

FIG. 3a shows a variant of the embodiment of a the cigarette rolling subassembly shown in FIG. 2c, which includes additional suction trough [32] that maintains the trough in the belt until the pinch-off of the rolling volume shown in FIG. 2d is established. The suction trough may include ports [23'] which communicate with the internal cavity in the platen. The indenter in this figure has descended to form a trough in the forming belt, and the cigarette paper [30] in this view has been delivered to a porous section of the belt. Optionally and preferably, rather than being secured to an arbor at the end of the platen, the forming belt may be secured to the end at [3] as shown. That end is the trailing edge or second edge of the platen, and its opposite edge is the leading or first edge of the platen.

Figure 3B:
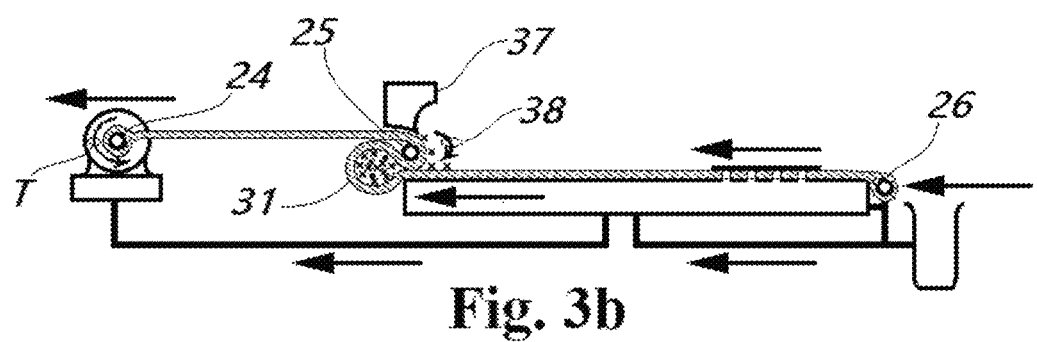
FIG. 3b shows a variant of the embodiment of a the cigarette rolling subassembly shown in FIG. 2d which includes a belt scraper to catch errant particles of smoking material which may have escaped from the rolling volume.

FIG. 3b shows a variant of the embodiment of a the cigarette rolling subassembly shown in FIG. 2d which includes a belt scraper [37] placed above the first arbor, to catch errant particles of smoking material which may have escaped from the rolling volume [31] by sticking to the forming belt in its motion. These particles are scraped off and fall onto the belt upstream of a portion of the belt which is entering the rolling volume, so they are re-introduced onto the rolling volume. The falling motion of these particles is indicated by the arrow [38.] The tensioning spindle [24,] tensioning motor, platen, platen spindle [26,] belt scraper, and catch basin are all mechanically attached to each other and move leftward and rightward as a group. The first arbor spindle [25] remains stationary while the previous components move leftward in this figure. The belt scraper is preferably positioned above the first arbor by a distance at least roughly equal to the thickness of the belt.

Figure 3C:
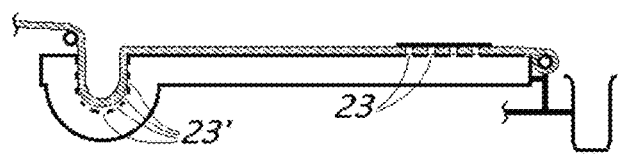
FIG. 3c shows an alternative mechanism for forming a trough into the belt.

FIG. 3c shows an alternative mechanism for forming a trough into the belt. Rather than an indenter, the platen or another component may include a trough populated with vacuum ports [23'] similar to the perforations elsewhere in the platen which are used to hold down the cigarette paper. In this embodiment shown the trough and its ports are sufficient to suck down and form a trough in the belt without need of an indenter. Other means of causing the belt to temporarily adhere to the trough include magnets or electromagnets in the trough attracting magnetically attractable materials incorporated in the belt, and hook-and-loop fabrics incorporated in the trough and on the backside of the belt.

Figure 4A:
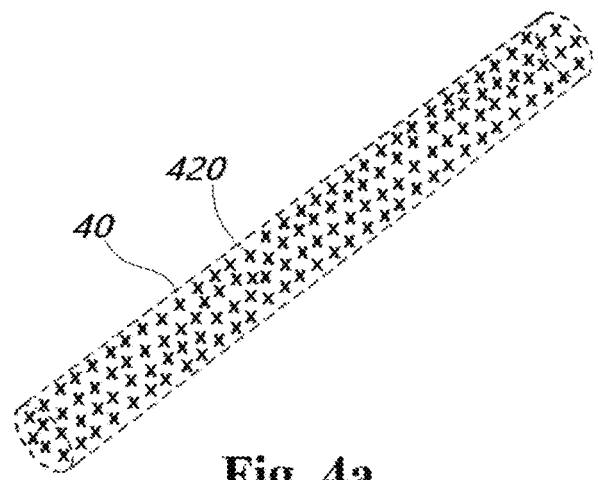
FIG. 4a shows a production step wherein a charge of smoking material sufficient for two cigarettes is formed into a cylindrical rolling volume.
Figure 4B:
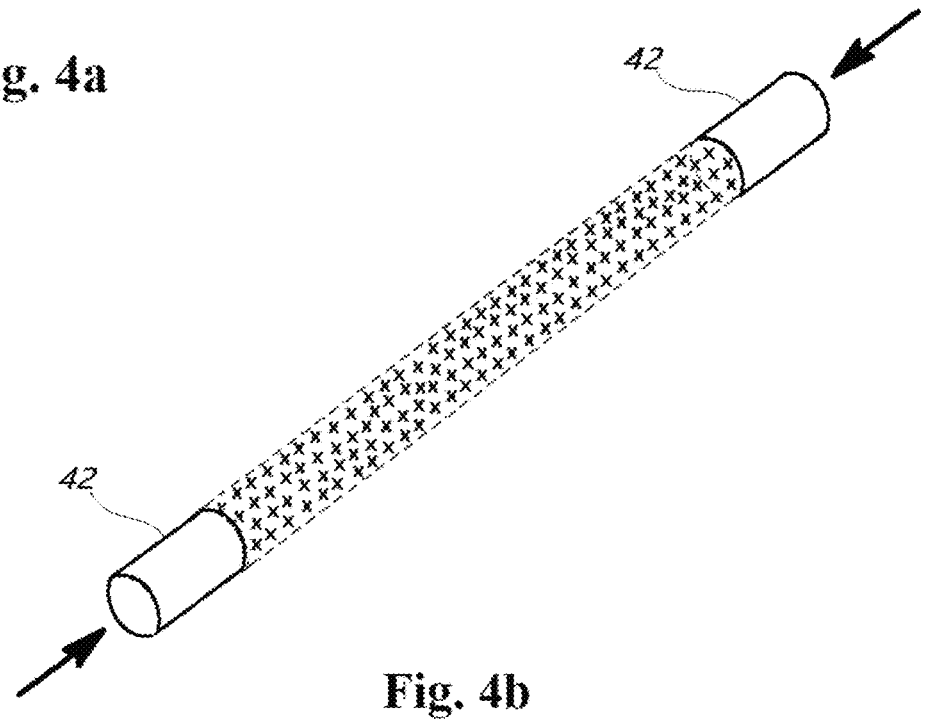
FIG. 4b shows a production step of filters being appended to a charge of smoking material sufficient for two cigarettes having been formed into a cylindrical rolling volume in a previous step.

FIG. 4a shows a production step wherein a charge of smoking material [420] sufficient for two cigarettes is formed into a cylindrical rolling volume [40.] FIG. 4b shows a production step of filters [42] being delivered to abut one or both ends of a charge of smoking material sufficient for two cigarettes having been formed into a cylindrical rolling volume in a previous step. The filters may be delivered via tubes by air pressure, or they may also be mechanically deposited in the belt trough before it is pinched off to form the rolling volume. Pistons or other pneumatic or mechanical aids may also be used to axially compress the filters onto the ends of the cylindrical mass of smoking material. Other pneumatic aids may include forceful air puffs delivered axially from the filter delivery tubes. A threaded rod rotating within a tube while engaged with a fixed component having a female thread may also act as an axial ram for pushing filters within a tube. Conversely, the treaded rod may be fixed from rotation, such as by including a longitudinal groove engaged with a fixed pin, and also engaged with a rotating female threaded component may also extend and retract longitudinally to serve as a ram for pushing filters.

Figure 4C:
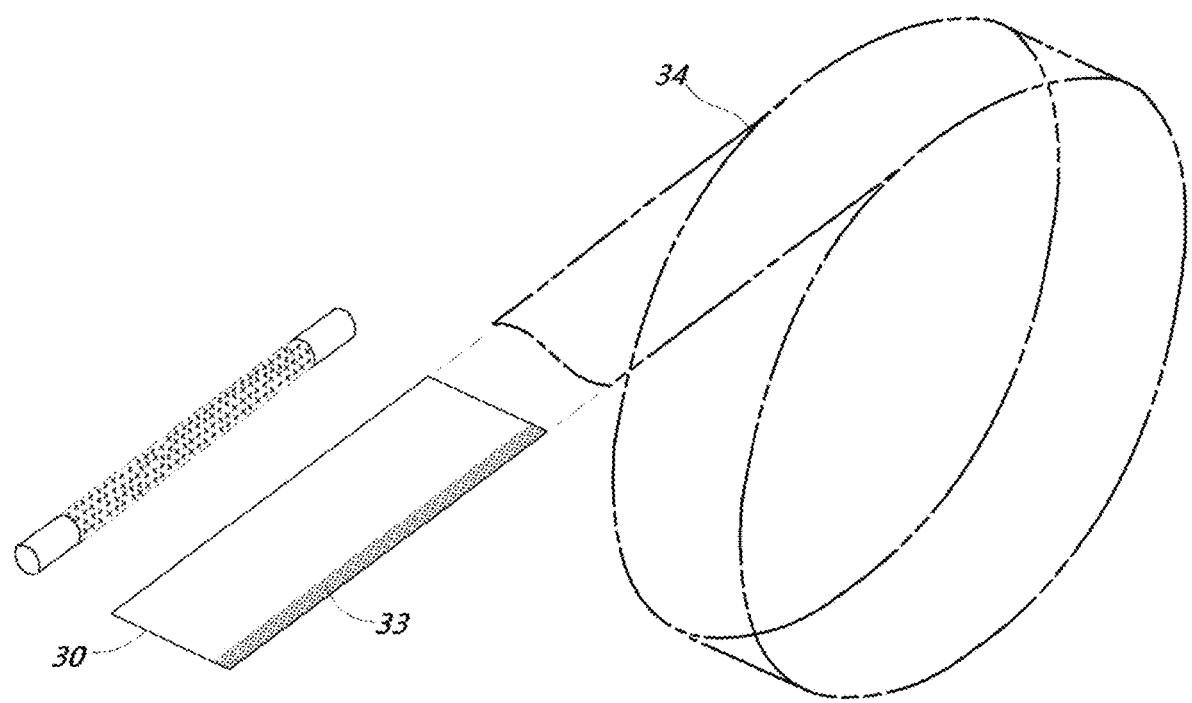
FIG. 4c shows a production step of delivering a cigarette paper onto the forming belt of the invention (not shown) ahead of the rolling volume of the step shown in FIG. 4b.

FIG. 4c shows a production step of delivering a cigarette paper [30] onto the forming belt of the invention (not shown) ahead of the rolling volume of the step shown in FIG. 4b. The cigarette paper includes an adhesive such as a moisture-activated adhesive which is moistened or otherwise activated upon its delivery onto the forming belt or alternatively may be activated shortly thereafter. According to another alternative embodiment within the scope of the invention, the paper is emplaced on the perforated section of the belt where suction may hold it in place, and an adhesive is applied to a substantially transverse edge. The adhesive [33] is deposited along an edge of the cigarette paper which is substantially transverse or substantially perpendicular to the direction of motion of the platen and the forming belt and substantially parallel to the axis of rotation of the rolling volume. Preferably, the cigarette paper may be delivered from bulk stores mounted within the enclosure of the cigarette rolling machine or positioned nearby for access by the cigarette paper pick assembly. Bulk stores may include boxes containing stacks of pre-cut cigarette papers or preferably rolls or spools [34] of strip material which may be cut to length by the paper pick assembly or by a cutter located in the vicinity of the paper pick assembly.

Figure 4D:
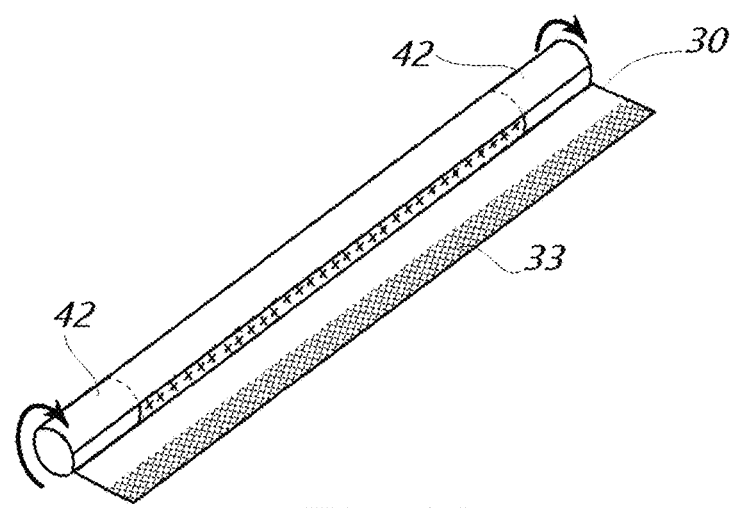
FIG. 4d shows a production step of entraining the cigarette paper of FIG. 4c into the rolling volume where it is formed into a paper tube enclosing the cylindrical volume of smoking material and incorporating a filter element at each of its ends.

FIG. 4d shows a production step of entraining the cigarette paper [30] of FIG. 4c into the rolling volume where it is formed into a paper tube enclosing the cylindrical volume of smoking material and incorporating a filter element [42] at each of its ends. The leading transverse edge of the paper makes its way around the periphery of the rolling volume until it encounters the prepared adhesive [33] on the trailing transverse edge of the cigarette paper, so that the leading and trailing edges adhere to each other and complete the paper tube containing the smoking material and the optional filters at both ends of the tube.

Figure 4E:
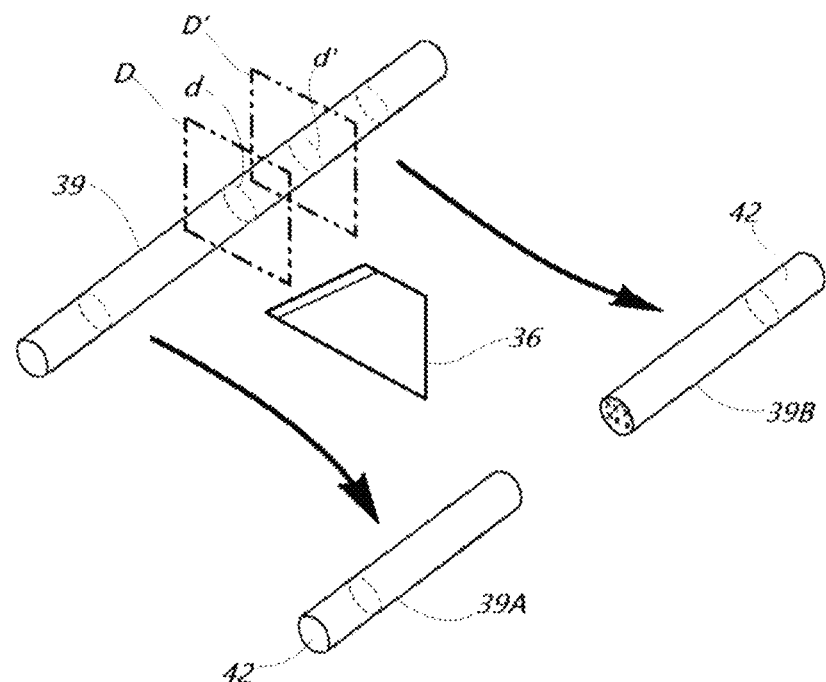
FIG. 4e shows a production step of parting the twinned pair of cigarettes into two individual cigarettes of substantially identical dimensions.

FIG. 4e shows a production step of parting the twinned pair of cigarettes [39] into two individual cigarettes of substantially identical dimensions [39A, 39B.] Besides drawing the twinned pair across a knife [36] having an inclined edge, rotating the twinned pair over a cutting wheel is another method of parting the twinned pair into individual cigarettes. The twinned pair of cigarettes define a cutting plane [D] which intersects the paper tube at a circle [d.] The orientation of the cutting plane may be defined as perpendicular to an axis defined by the first arbor, with a cutting knife coplanar to the cutting plane.

It is most preferred that the plane of the parting knife bisect the twinned pair at its cutting plane, or alternatively if a circular blade knife is used, it is most preferred that the cutting path of the knife follows the circle [d] as the twinned pair is rotated until the two individual cigarettes separate from each other. If filters are provided then each cigarette will have a filter [42] at one end of its paper tube.

It is also possible to locate a cutting plane [D'] offset from the center plane of the twinned pair, which intersects the paper tube at circle [d'.] This manufacturing option may be used to produce a long-burning cigarette and a short-burning cigarette, either as separate product lines like the 100 mm, 110 mm, and 120 mm offerings in tobacco cigarettes, or they may be packaged and sold in short and long paired sets such as a "full size for lunch break" and "short afternoon break chaser" pair. As another alternative, twinned cigarettes may be sold as-formed and not separated, so that end customers may cut the product into the sizes that they want. Thus a twinned pair of cigarettes in this specification represents two conjoined units regardless of whether or not they are cut apart into identical lengths.

Figure 5A:
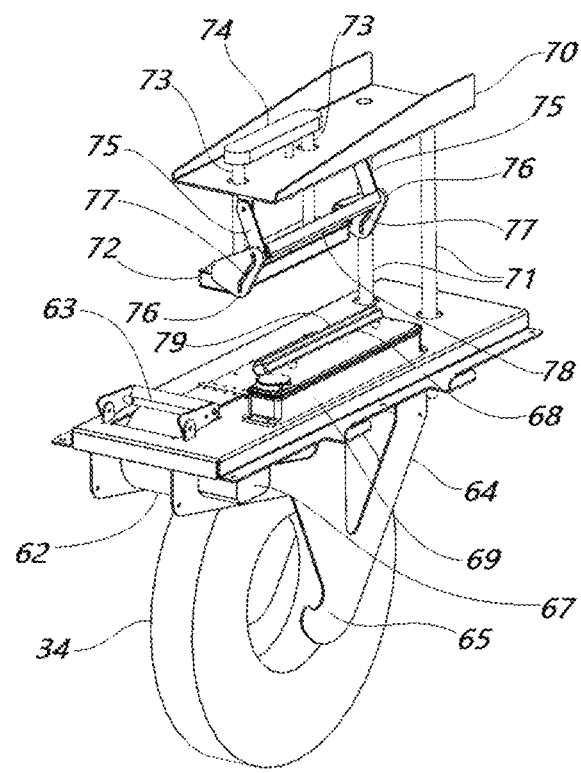
FIG. 5a shows an oblique view of a paper pick and place subassembly of an embodiment of a cigarette rolling machine in accordance with the invention.

FIG. 5a shows an oblique view of a paper pick and place subassembly of an embodiment of a cigarette rolling machine in accordance with the invention. Some components are omitted for clarity. Bulk paper strip is provided by a roll [34] hung between a pair of motor drive frame plates [64] and resting upon spool hooks [65.] The frame plates are held spaced apart by a plurality of struts [63.] A paper drive motor [67] drives a roller [62] which may preferably be made of polyurethane or another material that paper may adhere to effectively.

A fluid reservoir [69] contains water, or adhesive activating fluid, or a fluid which partially evaporates and then acts as an adhesive, or mucilage which is delivered into a wick [79] held in a wick retainer [68.] In this specification the fluid contents of the reservoir shall be referred to as "moistening fluid," and a cigarette paper with its adhesive activated and ready to bind itself into a paper tube shall be referred to as a "moistened paper." Compressing the wick downward into the reservoir operates a pumping mechanism to deliver moistening fluid to the wick in its retainer.

A pick arm [70] mounted on vertical displacement struts [71] raises and lowers a pick manifold [72] which is hollow and like the hollow platen, the manifold is connected to a vacuum line so that it may pick up a cigarette paper and retain it on its underside surface for placement onto the perforated section of the forming belt.

The pick manifold may be raised and lowered with respect to the pick arm by means of vertically displaceable pick manifold struts [73.] These are only moved with respect to the pick arm when depositing a moistened paper onto the forming belt at its perforated location. The two pick manifold struts are connected for coupled translation by a tie bar [74.] A transfer pad swings from a pair of swing arms [75] which each have a stud slidable within a serpentine groove [77] of a guide plate [76] affixed to the pick manifold. A transfer pad is a sponge pad or other absorbent, porous, or cancellous material which takes up moisture or fluid when immersed or moistened and imparts moisture when contacted by other dry objects. When the pick manifold struts raise the pick manifold with respect to the pick arm, the studs follow the course of the grooves in the guide plates and swing the transfer pad into a position adjacent to the pick manifold. When the pick manifold struts lower the pick manifold with respect to the pick arm, the studs follow the course of the grooves in the guide plates and swing the sponge pad into a position spaced apart from the pick manifold.

Figure 5B:
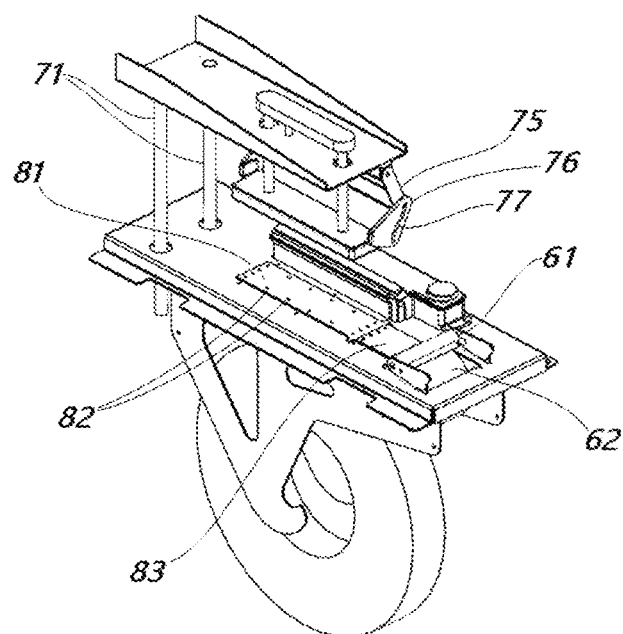
FIG. 5b shows the paper pick and place sub-assembly of the embodiment of the cigarette rolling machine shown in FIG. 5a but from an alternate oblique view.

FIG. 5b shows the paper pick and place sub-assembly of the embodiment of the cigarette rolling machine shown in FIG. 5a but from an alternate oblique view. The vertical displacement struts [71] raise and lower a pick arm from which a pick manifold is suspended. Two swing arms [75] are pinned to the underside of the pick arm for swinging a transfer pad [78] between a first position adjacent to the pick manifold and a second position spaced apart from the pick manifold. At least one guide plate [76] is affixed to the pick manifold, having a serpentine groove [77] so that a stud extending from the swing arm may ride within the serpentine groove during relative motion of the guide plate with respect to the stud.

A suction pad [81] receives a length of paper cut to length from the bulk spool after having been delivered to the suction pad pinched between the motor-driven roller [62] and an idling pinch roller [61.] The perimeter of the suction pad includes a plurality of apertures [82] connected to a vacuum line so that paper delivered to the suction pad is held securely in place. Additional suction holes within the perimeter of the suction pad may be necessary it the paper supply has an undesirable curl to be flattened out. A staging pad [83] with its own set of vacuum apertures holds the leading edge of the paper strip coming off the bulk spool. Parting off of a length of paper from the spool to become a cigarette paper sufficient to form a twinned pair of cigarettes occurs at the junction between the suction pad and the staging pad.

Figure 5C:
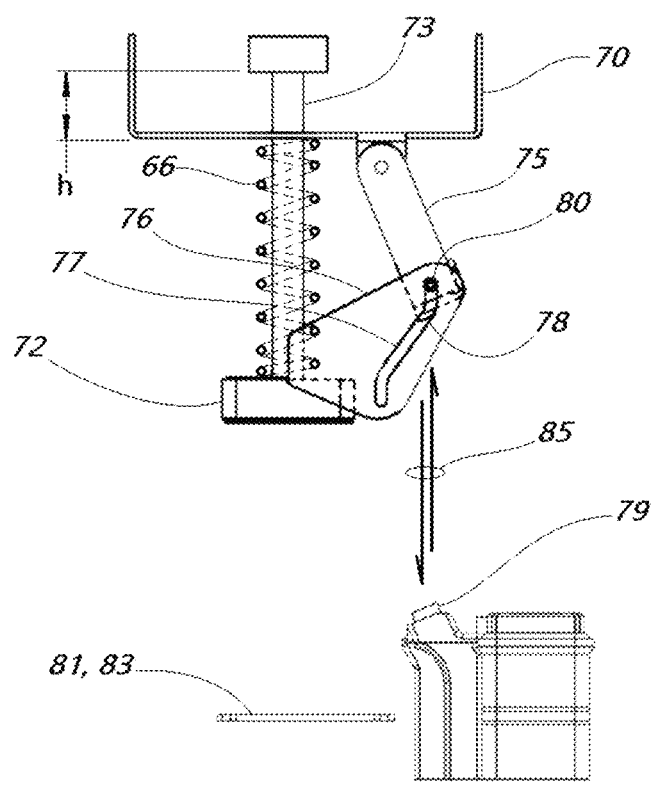
FIG. 5c shows motions of some components of the paper pick and place sub-assembly of the embodiment of the cigarette rolling machine shown in FIG. 5a, positioned for wetting or moistening the transfer pad.

FIG. 5c shows motions of some components of the paper pick and place sub-assembly of the embodiment of the cigarette rolling machine shown in FIG. 5a, positioned for wetting or moistening the transfer pad [78.] Dimension [h] shows a lowered position of the pick manifold [72] with the pick manifold struts [73] having descended with respect to the pick arm [70.] The stud [80] of the swing arm [75] follows in the serpentine groove [77] of the guide plate [76] so that the transfer pad is angularly abducted from the transfer pad and positioned over the wick [79] held in its wick retainer of the fluid reservoir. The wick is oriented at an angle complementary to the swing angle of the swing arms so the moisture receiving surface of the transfer pad and the moistening surface of the wick are substantially parallel. Upward and downward excursions of the pick arm with respect to the reservoir and its wick are represented by the pair of half-arrows [85] and are assisted by a pick arm strut spring [66.] The pick arm descends to lower the transfer pad onto the wick to transfer moistening fluid to the transfer pad. The pick arm strut spring helps mate the transfer pad onto the wick. The suction pad and staging pad [81, 83] are shown here as a location reference beneath the transfer pad.

Figure 5D:
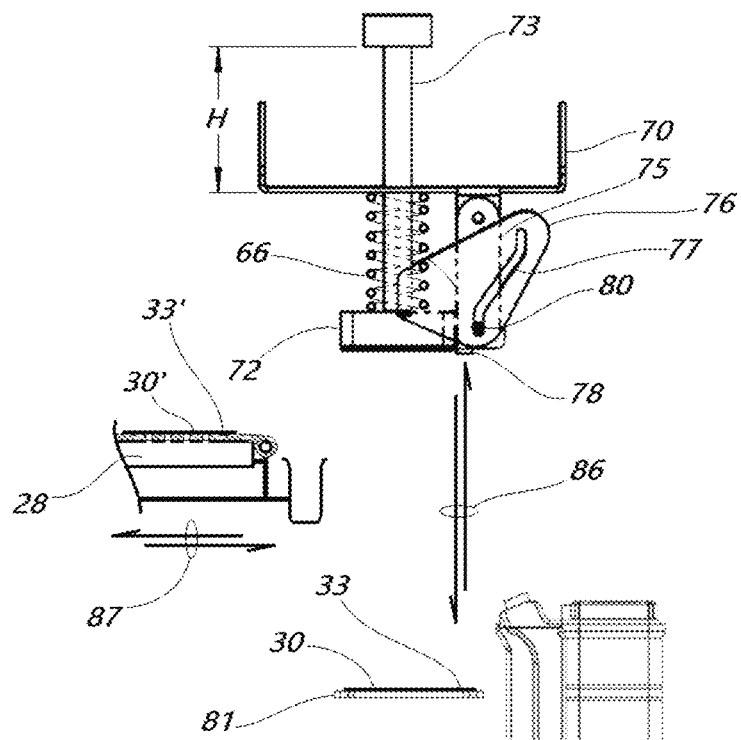
FIG. 5d shows the components of FIG. 5c positioned for delivering a moistened cigarette paper to a location on the forming belt.

FIG. 5d shows the components of FIG. 5c positioned for delivering a moistened cigarette paper to a location on the forming belt. The cigarette paper [30] is delivered to the suction pad [81.] The cigarette paper may be furnished from a bulk supply such as a spool and may be furnished with a moisture-activated adhesive along one of its edges [33] and activated by moisture delivered by the transfer pad, or alternatively the fluid in the reservoir may be an adhesive fluid delivered to the edge of the cigarette paper in an active state.

The pick arm rises and descends on its struts so that the transfer pad compresses against the wick on the reservoir and acquires moistening fluid thereby. This rising and falling motion of the pick arm and its components are indicated by vertical half-arrows [86] and is assisted by a pick arm strut spring [66.] When the pick manifold struts [73] rise to a raised position indicated by dimension [H] with respect to the pick arm [70] the guide plate [76] also rises together with the pick manifold so that the stud [80] on at least one of swing arms [75] of follows in the serpentine groove [77] of the guide plate and swings the swing arms to bring the transfer pad [78] into a position adjacent to the pick manifold [72.]

With the transfer pad adjacent to the pick manifold and charged with adhesive or moistening fluid, the pick arm descends upon the cigarette paper and vacuum is drawn in the pick manifold. Here, the pick arm strut spring helps the pick manifold address and acquire the cigarette paper. Since the moistened transfer pad lies adjacent to the pick manifold during this process step, the edge [33] of the cigarette paper now acquires moistening fluid from the transfer pad. The pick arm then rises high enough so that the platen [28] may slide so that the perforated section of the forming belt resides beneath the cigarette paper held by the pick manifold.

The lateral excursion of the platen is illustrated by horizontal half-arrows [87.] The pick arm then deposits the cigarette paper [30'] with its activated adhesive along one edge [33'.] At this step in the process, the pick arm strut spring helps the pick manifold place and register the cigarette paper onto the perforated section of the forming belt. Vacuum is drawn by the perforated section of the platen and vacuum is ceased in the pick manifold, so that when these separate, the cigarette paper with its activated adhesive along one edge [33'] now adheres to the forming belt and is borne away with it on the platen and the forming belt.

Figure 5E:
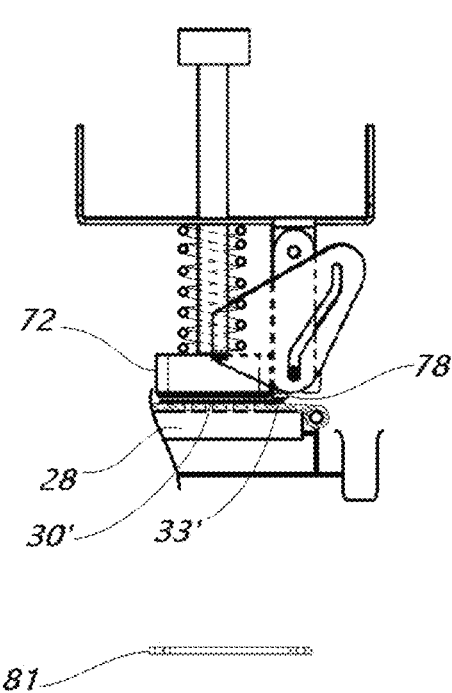
FIG. 5e shows the components of FIG. 5c positioned as they deliver a moisture-activated cigarette paper onto the perforated section of a forming belt supported by the platen.

FIG. 5e shows the components of FIG. 5c positioned as they deliver a moisture-activated cigarette paper [30', 33'] onto the perforated section of a forming belt supported by the platen [28.] The transfer pad [78] is adjacent to the pick manifold [72] and both of these components cooperate to place and moisten the cigarette paper. Suction pad [81] is shown in this figure for reference only.

Figure 5F:
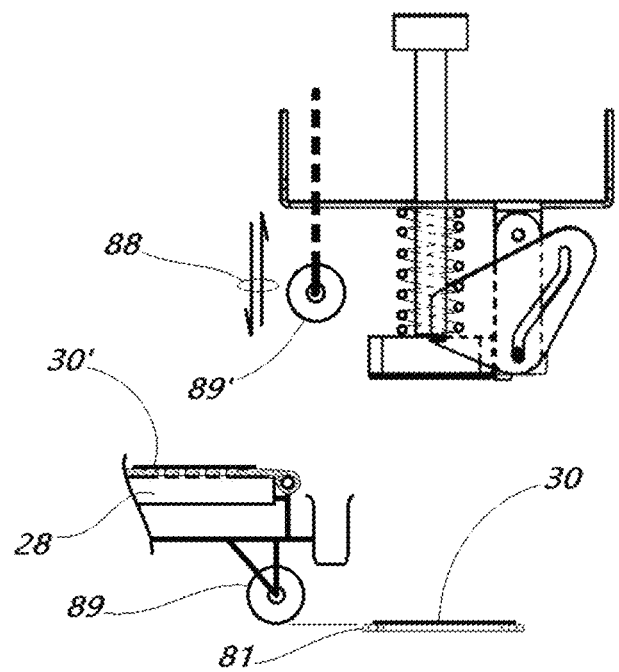
FIG. 5f shows optional locations on the pick arm or the platen where a cutting wheel may be installed for parting cigarette papers into lengths suitable for individual cigarettes.

FIG. 5f shows optional locations on the pick arm or the platen where a cutting wheel may be installed for parting cigarette papers. A cutting wheel [89] may be installed on the end of the platen [28] at a height so that the underside edge of the wheel may be rolled over a double-length section of cigarette paper [30] held on the suction pad [81] so that the paper is parted into two lengths suitable for individual cigarettes. Alternatively, a cutting wheel [89'] may be suspended from an extendable strut which may be raised and lowered from the pick arm in directions indicated by vertical half-arrows [88.] Using this sort of embodiment, after the pick manifold delivers the moistened paper to the perforated section of the forming belt, the cutting wheel may be lowered onto the belt at one edge of the paper so that lateral motion of the platen draws the paper beneath the cutting wheel so as to part it into two lengths for individual cigarettes.

According to other embodiments within the scope of the invention, a rigid knife blade [36] as seen in FIG. 2h or 4e may also be installed at the locations shown in this figure. Where installed on the underside of the platen, a double-length cigarette paper positioned on the suction pad may be sliced into two lengths suitable for individual cigarettes by allowing the knife to draw across it while it is held in position by vacuum on the suction pad. Alternatively, a rigid knife blade on a separate rising and lowering strut descending from the pick arm may be lowered onto a double-length cigarette paper positioned on the forming belt. Moving the platen laterally while the knife edge presses into the cigarette paper parts the paper into two lengths suitable for individual cigarettes.

Figure 6A:
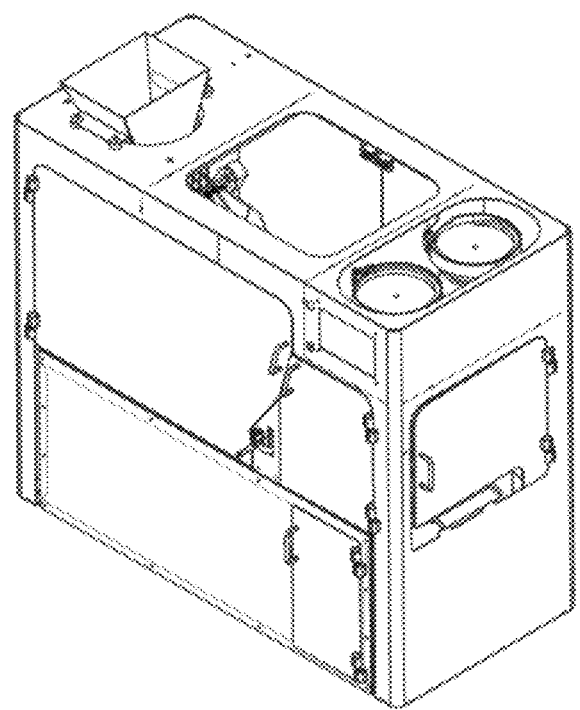
FIG. 6a shows a top front right oblique view of an alternate embodiment of a cigarette rolling machine in accordance with the invention.
Figure 6B:
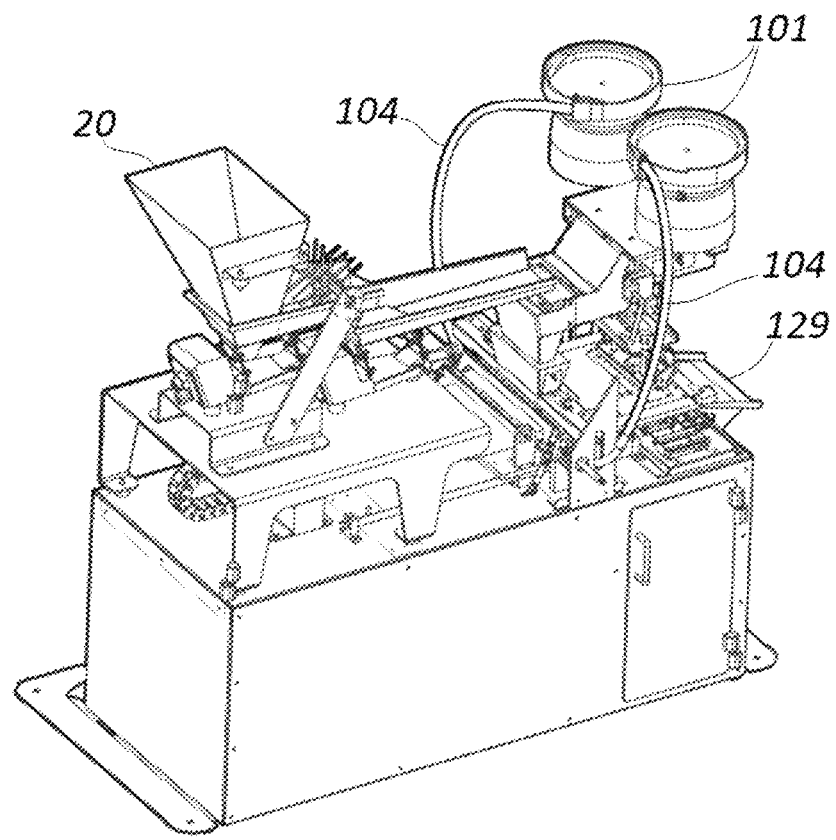
FIG. 6b shows a top front left oblique view of the cigarette rolling machine of FIG. 6a, with some of the doors and panels removed to reveal certain subassemblies.

FIG. 6a shows a top front right oblique view of an alternate embodiment of a cigarette rolling machine in accordance with the invention. FIG. 6b shows a top front left oblique view of the cigarette rolling machine of FIG. 6a, with some of the doors and panels removed to reveal certain subassemblies. Bulk masses of smoking material are fed into the input hopper [20,] and cigarette filters, if used in a production run, are loaded in bulk into vibratory bowl feeders [101.] Aligning geometry in the vibratory bowls orient the filters endwise into filter delivery tubes [104.] Completed products are dispensed from a chute [129.]

Figure 6C:
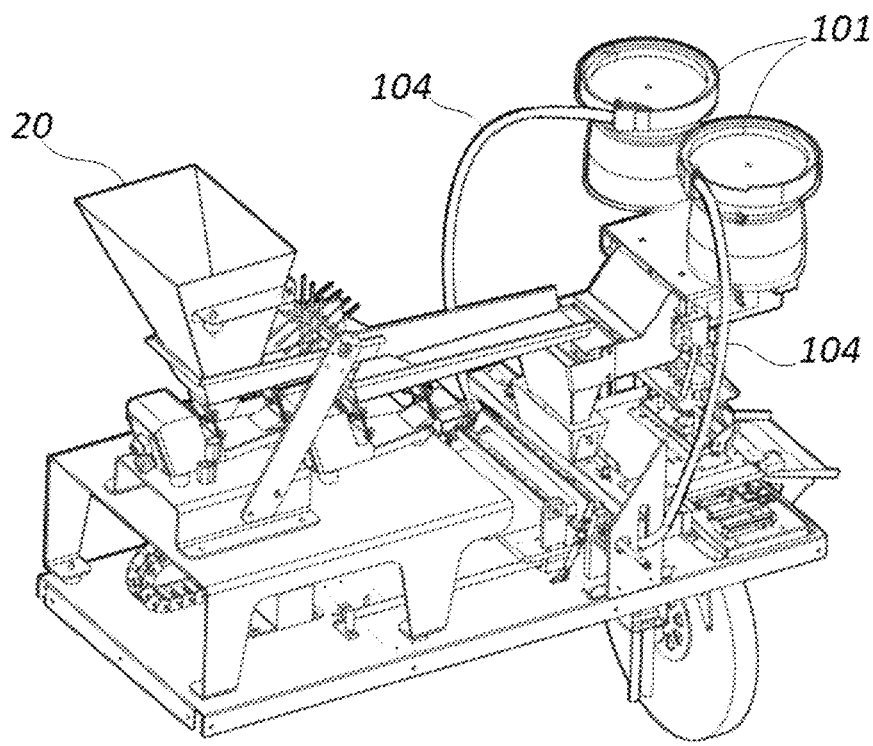
FIG. 6c shows another top front left oblique view of the cigarette rolling machine of FIG. 6a, with more enclosure components removed.

FIG. 6c shows another top front left oblique view of the cigarette rolling machine of FIG. 6a, with more enclosure components removed. Prominently visible are the input hopper [20,] vibratory bowl feeders [101] for cigarette filters, and filter delivery tubes [104.]

Figure 6D:
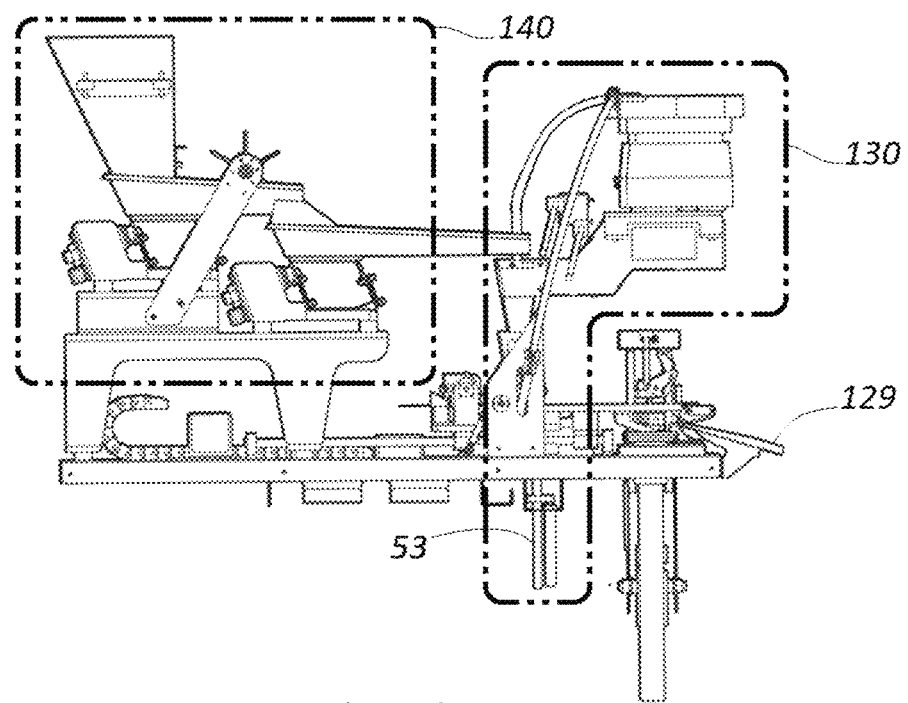
FIG. 6d shows a front elevation view of the cigarette rolling machine of FIG. 6a, identifying the dual-chute vibratory feeder subassembly, the weighing and indenting subassembly, and the vibratory bowls which deliver filters to twinned pairs of cigarettes.

FIG. 6d shows a front elevation view of the cigarette rolling machine of FIG. 6a, identifying the dual-chute vibratory feeder subassembly [140,] the weighing and indenting subassemblies [130,] the vibratory bowls which deliver filters to twinned pairs of cigarettes, and the chute [129] where completed products emerge. The rising and descending motions of the dispenser subassembly are driven by the motions of hopper elevating struts [53.]

Figure 7:
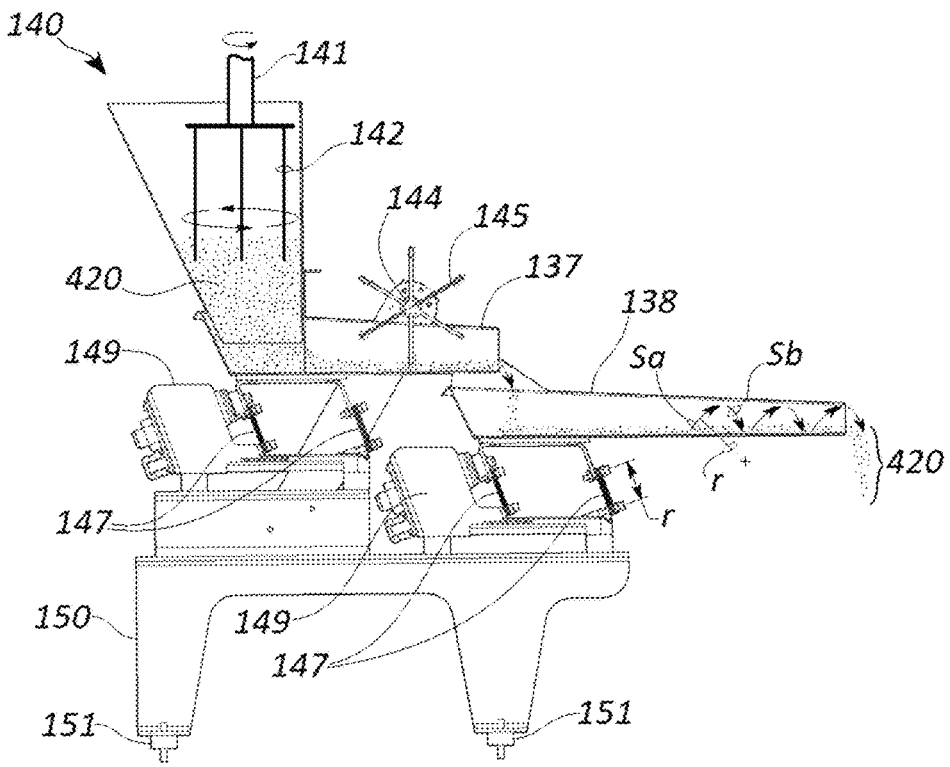
FIG. 7 shows a front cross section view of an embodiment of a dual-chute vibratory feeder subassembly in accordance with the invention.

FIG. 7 shows a front cross section view of an embodiment of a dual-chute vibratory feeder subassembly [140] in accordance with the invention. An agitator [141] includes a rotating plate from which three or a suitable number of vertical rods [142] descend. These rotate near the lower outlet of the input hopper agitate bulk masses of smoking material [420] so that it drops into the first [137] of two long horizontal channels or chutes mounted on slanted leaf springs [147.] Vibration actuators [149] excite the chutes which are constrained to motions in an arc of radius [r] set by the free flexible length of the slanted leaf springs. Material movement in the upper chute is assisted by a rotating rake shaft [144] and its radial arrays of rake tines [145.] The system moves material from the bulk hopper to a weighing tray described in later figures. Process controllers may be used to energize the upper and lower chute vibration actuators on demand of the weighing tray and the cycling of the dispensing subassembly as part of a kanban delivery regime. Alternatively, the rake may be used to retard delivery of smoking material by non-rotation, slow rotation, or retrograde rotation.

The first chute runs at slower feed rate, while the second chute [138] operates intermittently on demand from the bucket, smoothing out the conveying demand further upstream by buffering the intermittent nature of demand from the lower tray and weighing tray. Operation and halting of the vibratory feed trays is controlled by metered monitoring of product as it accumulates in the weighing bucket. Lateral motion of the material in the chutes occurs by saltation in which particles are thrown upwards [Sa] and along the egress direction of the chute as constrained by the radius of the leaf springs in cantilevered flexion, and then descend by gravity [Sb.] The horizontal components of both these motions combine to propagate the material along the egress direction of the chute. Both chutes and their vibratory mechanisms are secured to a chute frame [150] which is attached to the main frame of the machine by vibration absorbing studs [151.]

Figure 8:
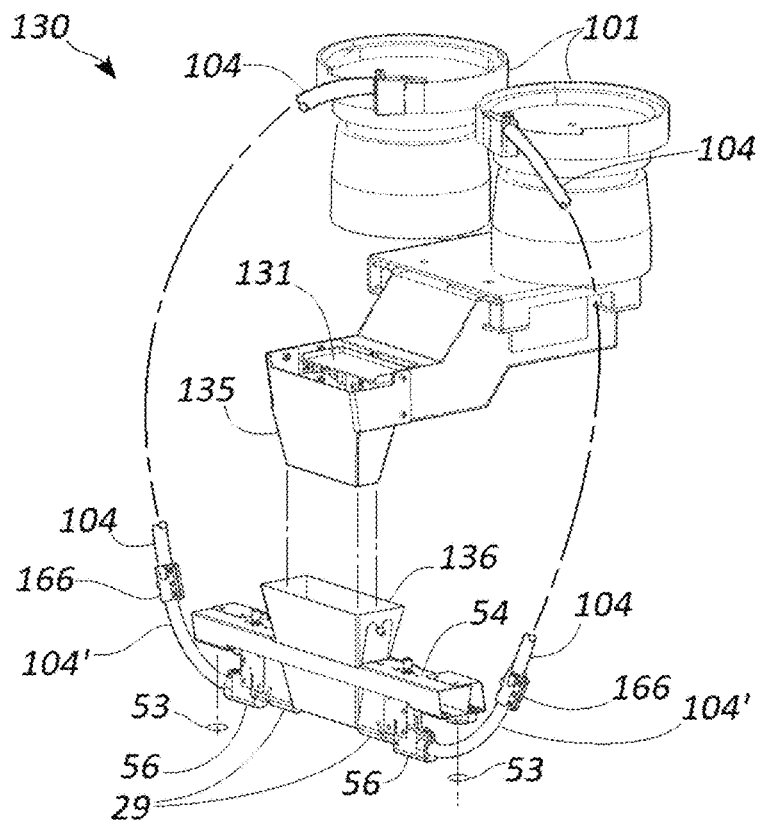
FIG. 8 shows a weighing and indenting subassembly and vibratory bowl system in accordance with the invention.

FIG. 8 shows a weighing and indenting subassembly and vibratory bowl system [130] in accordance with the invention. Filter delivery tubes [104] descend from vibratory bowls [101] to the dispenser subassembly. Air assist manifolds [166] inject puffs of air within the delivery tubes which push filters downstream of them and also entrain upstream filters by the Venturi effect. The sections of tube connecting between these assist manifolds and the dispenser subassembly are called filter stack tubes [104'.] The weighing subassembly includes a tippable weighing tray [131] poised above a first stationary funnel [135] which nests within a second dispensing funnel [136] mounted to a main transverse strut called a hopper support bracket [54.] The dispenser subassembly rises and descends so that the forming belt indenter features [29] form the trough in the forming belt as described previously. The rising and descending motions of the dispenser subassembly are driven by the motions of hopper elevating struts [53.] Two filter positioners attach to the sides of the dispensing funnel, and these are each capped by a filter tube flange [56] which feeds filters delivered by the filter stack tube.

Figure 9:
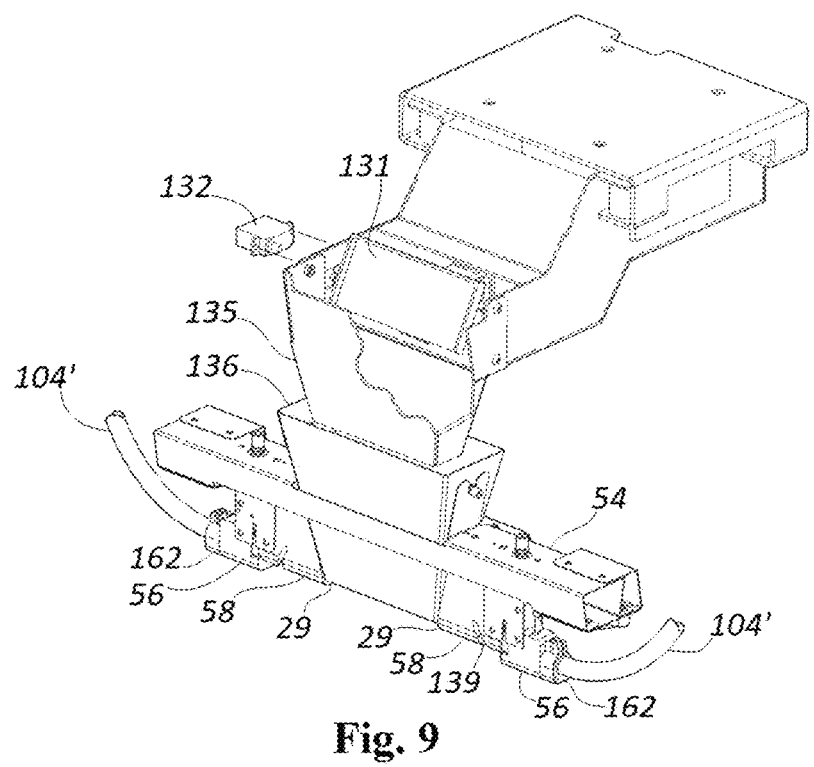
FIG. 9 shows embodiments of a tipping tray, nested hoppers, an indenting subassembly, and filter delivery components in accordance with the invention.

FIG. 9 shows embodiments of a tipping tray [131,] nested hoppers [135] and [136,] an indenting subassembly, and filter delivery components in accordance with the invention. Precise and accurate weighing may be preferably accomplished using a beam type load cell having four strain gauges and a Wheatstone bridge. A load cell amplifier sends signals for calibration of an empty bucket. A set point programmed into the process controller signals that an indent and roll-up cycle is ready to begin. The weight sensors may be used to verify that the tippable tray and upper funnel have both emptied completely and that sticky material is not accumulating or left behind, and thus ensure that a complete double dose (typically about 1 gram) of smoking material has been delivered. The weighing sensors are mounted on their own vibration isolators to preserve sensitivity of the load cell. The tipping plate is shown in a tipped position which would precipitate a measured change of smoking material into a trough indented into the forming belt. Tipping is accomplished by a tipping motor [132.] The stationary funnel does not touch the funnel of the dispensing subassembly.

The dispensing subassembly includes a hopper [136] mounted on a hopper support bracket [54,] and two filter positioners [58] which laterally bestride the dispensing funnel. A filter stack tube [104'] connects to each of the filter positioners by a filter tube flange. The filter positioners each include a trough indenter feature [29] and a stop face [139.] Once the filter positioners have descended into the trough of the forming belt, filters are admitted past the filter tube flange [56] to collide with the stop face and be retained within the trough after the dispensing subassembly withdraws from the trough. Hose clamps [162] hold the filter stack tubes to their flanges.

Figure 10:
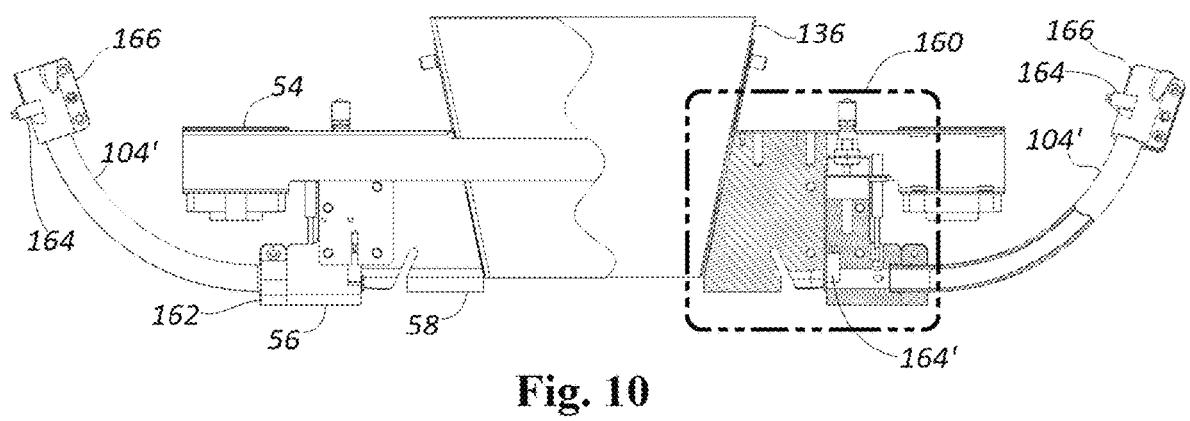
FIG. 10 shows a left side, partial cross section view of an indenting subassembly, and filter delivery components in accordance with the invention.

FIG. 10 shows a left side, partial cross section view of an indenting subassembly, and filter delivery components in accordance with the invention affixed to a hopper support bracket [54.] A detail portion [160] of this view is explained in further figures below. The air assist port [166] includes a photodetector which may be used to detect that an inventory of filters in the filter stack tube [104'] has accumulated to fill the entirety of the stack tube. The filter stack tubes are secured to the filter tube flange [56] with a hose clamp [162.] A second photodetector [164'] located in the filter positioner detects a minimum of one filter ready to be installed. A kanban signaling system may be used to turn on the vibratory bowl feeders to replenish a depleted filter stack tube at least up to the level indicated by the photodetector in the air assist port. Filter positioners [58] are installed on both sides of the dispensing funnel [136] or hopper.

Figure 11:
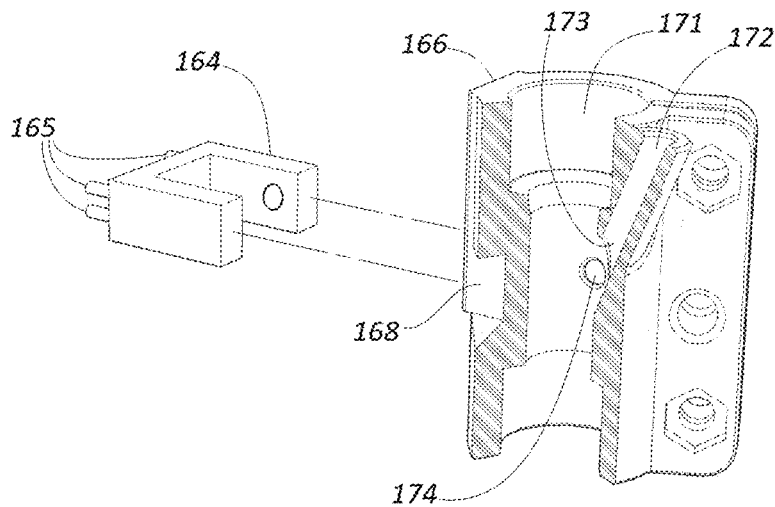
FIG. 11 shows components of an air assist port in accordance with the invention.

FIG. 11 shows components of an air assist port [166] in accordance with the invention. The air assist port has a central passage [171] through which filters pass. A photodetector [164] includes electrical contacts [165] to transmit signals, and a light source aimed at a light detector. The body of the air assist port includes viewports [174] which become optically obstructed when a filter is present within that portion of the central passage. A cutout [168] receives the photodetector so that its sensor and light source align with the view ports in the body of the air assist port. An air inlet [172] receives high pressure air aimed into the central passage at an acute angle through an inlet orifice [173.] Constant pressure or intermittent puffs of air nudge the filters along in the filter delivery tube and the filter stack tube. The acute injection angle may also entrain upstream filters into the filter stack tube by the Venturi effect.

Figure 12:
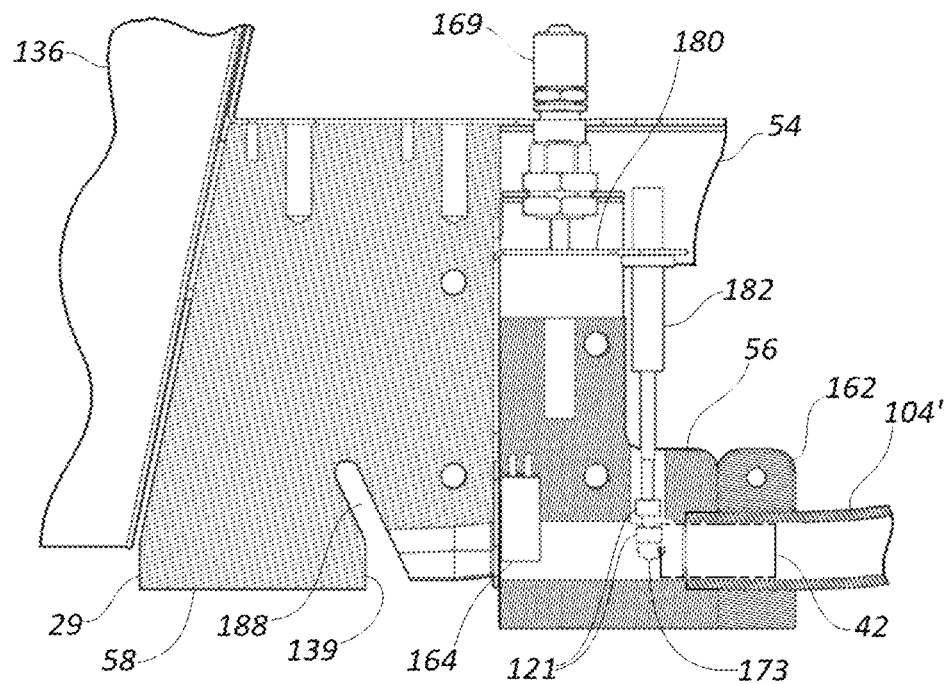
FIG. 12 shows an enlargement of detail portion shown in FIG. 10.

FIG. 12 shows an enlargement of detail portion [160] shown in FIG. 10. A filter positioner and a hopper [136] are mounted to a hopper mount bracket [54.] A filter stack tube [104'] attaches to a filter tube flange [56] with a hose clamp [162.] A second photodetector [164] located in the filter positioner detects a minimum of one filter ready to be installed. The filter tube flange has an internal passage aligned with a manifold of the filter positioner [58] which has a passage which ends with a stop surface [139.] The passage is aligned with a lower profile of the positioner which acts as an indenter [29.] A filter detainer yoke [180] is raised and lowered by a solenoid [169] to introduce and remove its detainer features into the passages of the filter tube flange and the filter positioner. The second of two detainers includes a pogo pin [121] which may stop a filter by blocking the passage or by compliantly impinging upon a filter with its compliant or preloaded spring mechanism [182.] The detainers cooperate to intermittently detain travel of cigarette filters within the passage so that an air puff admitted through an inlet orifice [173] advances only one filter at a time. The admitted filter travels within the passages of the filter tube flange and the filter positioner until it collides with and stops at the stop face. Excess air escapes around the filter through oblique or transverse slots [188] cut into the manifold and passage of the filter positioner.

Figure 13:
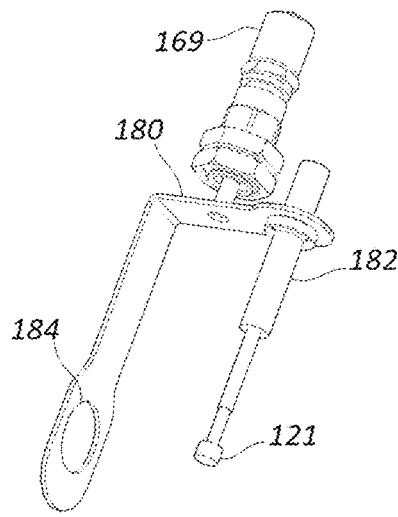
FIG. 13 shows a yoke subassembly for a cigarette rolling machine in accordance with the invention.

FIG. 13 shows a filter detainer yoke subassembly for a cigarette rolling machine in accordance with the invention. A solenoid [168] raises and lowers a yoke [180] having first and second detainers. The first detainer includes gate feature having an aperture [184] large enough to pass a filter through it. The second detainer includes a pogo pin [121] which may stop a filter by blocking the passage or by compliantly impinging upon a filter with its compliant or preloaded spring mechanism [182.] When the gate is partially introduced into the passageway it obstructs passage of a filter, but when depressed further the aperture aligns with the passage and allows a filter to pass. Other shapes such as an "L" or a "J" shape may also be used within the scope of the invention to act as a slidable gate which obstructs passage of a filter on partial insertion but allows passage upon further insertion which moves the obstruction clear of the passageway. Alternatively the yoke may be raised and lowered by other means, such a pneumatic or hydraulic cylinder, or a power thread mechanism, a three-bar linkage, or a scissor extension and retraction mechanism.

Figure 14:
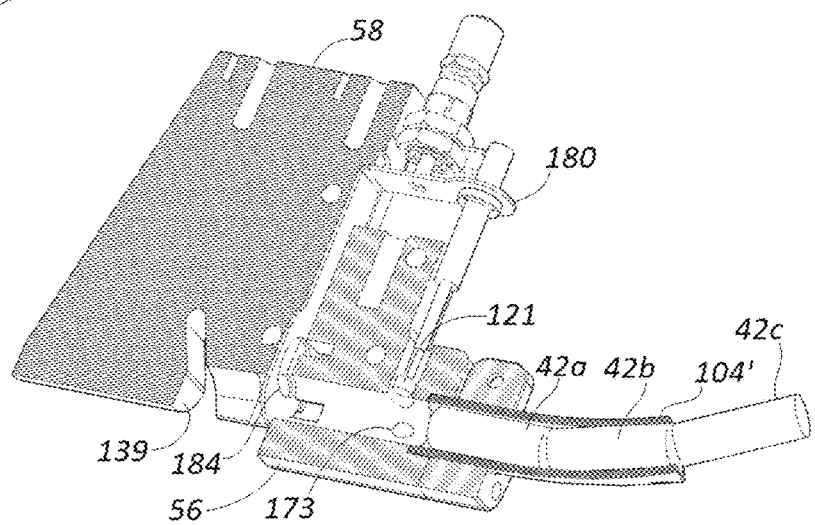
FIG. 14 shows the components of the partial cross section of FIG. 10 during a production step in accordance with the invention.

FIG. 14 shows the components of the partial cross section of FIG. 10 during a production step in accordance with the invention. With the yoke [180] in a raised position, the gate [184] is held with its aperture out of alignment with the aligned passages of the filter positioner [58] and the filter tube flange [56.] The pogo pin is also raised clear of the passageway, so that gravity or air assists would allow a succession of filters [42a, 42b, 42c,] to advance until the foremost of these is detained by the gate in its obstruction position.

Figure 15:
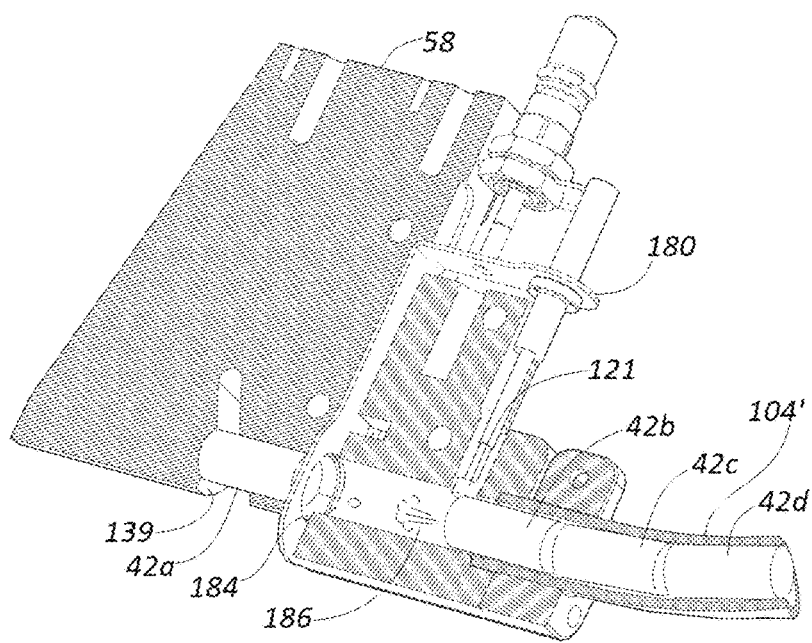
FIG. 15 shows the components of the partial cross section of FIG. 10 during another production step in accordance with the invention.

FIG. 15 shows the components of the partial cross section of FIG. 10 during another production step in accordance with the invention. The yoke [180] is now lowered so that while the gate [184,] which is the first detainer, slides so that its aperture aligns with the passageway, the pogo pin, which is the second detainer, also descends to impinge upon the second filter [42b] in line. The lateral force of the pogo pin holds the filter in place by friction. Alternatively, depending on the length of the filter or the separation between the first and second detainers, the second detainer may block the passageway ahead of the second filter rather than impinging upon it.

With the second filter thus detained, a puff of air [186] from an air inlet orifice ([173] in FIG. 14 but occluded from this view by filter [42b]) is used to advance the foremost filter [42a] to enter the manifold of the filter positioner and halt at its stop feature [139.] Gravity or an assist from air assist port [166 of FIG. 10] advances the succession of filters [42c] [42d] et al, which all line up behind detained filter [42b.] When the dispensing assembly rises out of the trough, it leaves the measured quantity of smoking material and the filters deposited in the trough of the forming belt, ready to be pinched off and rolled into a twinned pair of cigarettes by the manufacturing means and methods described in herein. Alternatively a filter may be advanced within the passageways by other mechanical means such as a push rod or a traction drive or conveying belt, or a succession of rollers.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture. Unauthorized instances of apparatuses and methods claimed herein are to be considered infringing, no matter where in the world they are advertised, sold, offered for sale, used, possessed, or performed.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A rolling paper pick and place apparatus comprising:
   a bulk rolling paper source;
   a staging pad configured to receive and temporarily hold a rolling paper segment of the bulk rolling paper source;
   a pick arm operably maneuverable to and from the staging pad by a plurality of pick arm struts; and
   a pick manifold operably maneuverable to and from the pick arm by a plurality of pick manifold struts;
   wherein the pick manifold is configured to temporarily hold the rolling paper segment and transfer the rolling paper segment from the staging pad to at least one pad other than the staging pad.

2. The rolling paper pick and place apparatus of claim 1, wherein the plurality of pick arm struts, the plurality of pick manifold struts, or both operate to bring the pick manifold in proximity with the staging pad and the at least one pad other than the staging pad such that the rolling paper segment can be temporarily held by or transferred between the staging pad, the pick manifold, and the at least one pad other than the staging pad.

3. The rolling paper pick and place apparatus of claim 1, wherein the pick manifold, staging pad, and the at least one pad other than the staging pad contain a plurality of clips, a vacuum cavity with a plurality of perforations, a plurality of electromagnets or any combination thereof for transferring or temporarily holding the rolling paper segment.

4. The rolling paper pick and place apparatus of claim 1, further comprising a paper drive motor configured to feed the bulk rolling paper source onto the staging pad.

5. The rolling paper pick and place apparatus of claim 1, further comprising a cutting apparatus configured to separate the rolling paper segment from at least a portion of the bulk rolling paper.

6. The rolling paper pick and place apparatus of claim 1, further comprising an adhesive source containing an adhesive or an adhesive activating fluid, wherein the adhesive source is configured to apply the adhesive or the adhesive activating fluid to the bulk rolling paper or the rolling paper segment.

7. The rolling paper pick and place apparatus of claim 6, wherein the adhesive is a dry adhesive, a fluid adhesive, a fluid activated adhesive, a fluid which partially evaporates and then acts as an adhesive, mucilage, or any combination thereof.

8. The rolling paper pick and place apparatus of claim 6, further comprising:
   a wick configured to draw from the adhesive source such that the wick contains an amount of the adhesive or the adhesive activating fluid thereon;
   wherein the operation of the plurality of pick arm struts and the plurality of pick manifold struts brings the rolling paper segment in contact with the wick such that the rolling paper segment contains an amount of adhesive or adhesive activating fluid thereon.

9. The rolling paper pick and place apparatus of claim 8, further comprising:
   a transfer pad connected to the pick arm by at least one swing arm, at least one guide plate with a serpentine groove, and at least one stud;
   wherein a first end of at least one swing arm is connected to the pick arm, a second end of the at least one swing arm is connected by the at least one stud to the at least one guide plate's serpentine groove such that the at least one stud can slide along the at least one guide plate's serpentine groove, and the at least one guide plate is connected to the pick manifold;
   wherein the operation of the plurality of pick manifold struts moves the transfer pad to and from the pick manifold by the at least one swing arm, the at least one guide plate with the serpentine groove and the at least one stud such that the transfer pad is either adjacent the pick manifold or held in a position away from the pick manifold;
   wherein the operation of the plurality of pick arm struts connects the transfer pad either with the wick when the plurality of pick manifold struts hold the transfer pad away from the pick manifold or with the rolling paper segment when the plurality of pick manifold struts hold the transfer pad adjacent to the pick manifold;
   wherein the operation of both the plurality of pick arm struts and the plurality of pick manifold struts connect the transfer pad with the wick to transfer adhesive or adhesive activating fluid from the wick to the transfer pad, which adhesive or adhesive activating fluid can then by operation of both the plurality of pick arm struts and the plurality of pick manifold struts be applied by the transfer pad to the rolling paper segment.

10. The rolling paper pick and place apparatus of claim 1, further comprising a platen configured to receive the rolling paper segment, wherein the at least one pad other than the staging pad is the platen.

11. A rolling paper pick and place apparatus, comprising:
a bulk rolling paper source;
a staging pad configured to receive and temporarily hold a rolling paper segment of the bulk rolling paper source;
a pick arm operably maneuverable to and from the staging pad by a plurality of pick arm struts;
a pick manifold operably maneuverable to and from the pick arm by a plurality of pick manifold struts; and
a platen configured to receive the rolling paper segment;
wherein the pick manifold is configured to temporarily hold the rolling paper segment and transfer the rolling paper segment from the staging pad to the platen.

12. The rolling paper pick and place apparatus of claim 11, wherein the plurality of pick arm struts, the plurality of pick manifold struts, or both operate to bring the pick manifold in proximity with the staging pad and the platen such that the rolling paper segment can be temporarily held by or transferred between the staging pad, the pick manifold, and the platen.

13. The rolling paper pick and place apparatus of claim 11, wherein the pick manifold, staging pad, and the platen contain a plurality of clips, a vacuum cavity with a plurality of perforations, a plurality of electromagnets or any combination thereof for transferring or temporarily holding the rolling paper segment.

14. The rolling paper pick and place apparatus of claim 11, further comprising a paper drive motor configured to feed the bulk rolling paper source onto the staging pad.

15. The rolling paper pick and place apparatus of claim 11, further comprising a cutting apparatus configured to separate the rolling paper segment from at least a portion of the bulk rolling paper.

16. The rolling paper pick and place apparatus of claim 11, further comprising an adhesive source containing an adhesive or an adhesive activating fluid, wherein the adhesive source is configured to apply the adhesive or the adhesive activating fluid to the bulk rolling paper or the rolling paper segment.

17. The rolling paper pick and place apparatus of claim 16 wherein the adhesive is a dry adhesive, a fluid adhesive, a fluid activated adhesive, a fluid which partially evaporates and then acts as an adhesive, mucilage, or any combination thereof.

18. The rolling paper pick and place apparatus of claim 16, further comprising a wick configured to draw from the adhesive source such that the wick contains the adhesive or the adhesive activating fluid thereon, wherein the operation of both the plurality of pick arm struts and the plurality of pick manifold struts bring the rolling paper segment in contact with the wick such that the rolling paper segment contains an amount of adhesive or adhesive activating fluid thereon.

19. The rolling paper pick and place apparatus of claim 18, further comprising:
a transfer pad connected to the pick arm by at least one swing arm, at least one guide plate with a serpentine groove, and at least one stud;
wherein a first end of the at least one swing arm is connected to the pick arm, a second end of the at least one swing arm is connected by the at least one stud to the at least one guide plate's serpentine groove such that the at least one stud can slide along the at least one guide plate's serpentine groove, and the at least one guide plate is connected to the pick manifold;
wherein the operation of the plurality of pick manifold struts moves the transfer pad to and from the pick manifold by the at least one swing arm, the at least one guide plate with the serpentine groove and the at least one stud such that the transfer pad is either adjacent the pick manifold or held in a position away from the pick manifold;
wherein the operation of the plurality of pick arm struts connects the transfer pad either with the wick when the plurality of pick manifold struts hold the transfer pad away from the pick manifold or with the rolling paper segment when the plurality of pick manifold struts hold the transfer pad adjacent to the pick manifold;
wherein the operation of both the plurality of pick arm struts and the plurality of pick manifold struts connect the transfer pad with the wick to transfer the adhesive or the adhesive activating fluid from the wick to the transfer pad, which the adhesive or the adhesive activating fluid can then by operation of both the plurality of pick arm struts and the plurality of pick manifold struts be applied by the transfer pad to the rolling paper segment.

20. A rolling paper pick and place apparatus, comprising:
a bulk rolling paper source;
a staging pad configured to receive and temporarily hold a rolling paper segment of the bulk rolling paper source;
a pick arm operably maneuverable to and from the staging pad by a plurality of pick arm struts; and
a pick manifold operably maneuverable to and from the pick arm by a plurality of pick manifold struts;
a platen;
a paper drive motor configured to feed the bulk rolling paper source onto the staging pad;
a cutting apparatus configured to separate the rolling paper segment from at least a portion of the bulk rolling paper;
an adhesive source containing an adhesive or an adhesive activating fluid;
a wick configured to draw from the adhesive source such that the wick contains an amount of the adhesive or the adhesive activating fluid thereon; and
a transfer pad connected to the pick arm by at least one swing arm, at least one guide plate with a serpentine groove, and at least one stud;
wherein the pick manifold is configured to transfer the rolling paper segment from the staging pad to the pick manifold and from the pick manifold to the platen;
wherein the plurality of pick arm struts, the plurality of pick manifold struts, or both operate to bring the pick manifold in proximity with the staging pad and the platen such that the rolling paper segment can be transferred between the staging pad, the pick manifold, and the platen;
wherein the pick manifold, staging pad, and the platen contain a plurality of clips, a vacuum cavity with a plurality of perforations, a plurality of electromagnets or any combination thereof for transferring or temporarily holding the rolling paper segment;

wherein the adhesive is a dry adhesive, a fluid adhesive, a fluid activated adhesive, a fluid which partially evaporates and then acts as an adhesive, a mucilage, or any combination thereof;

wherein the adhesive source is configured to apply the adhesive to the bulk rolling paper or to at least one portion of the rolling paper segment;

wherein the operation of the plurality of pick arm struts and the plurality of pick manifold struts brings the rolling paper segment in contact with the wick such that the rolling paper segment contains an amount of adhesive thereon;

wherein a first end of at least one swing arm is connected to the pick arm, a second end of the at least one swing arm is connected by the at least one stud to the at least one guide plate's serpentine groove such that the at least one stud can slide along the at least one guide plate's serpentine groove, and the at least one guide plate is connected to the pick manifold;

wherein the operation of the plurality of pick manifold struts moves the transfer pad to and from the pick manifold by the at least one swing arm, the at least one guide plate with the serpentine groove and the at least one stud such that the transfer pad is either adjacent the pick manifold or held in a position away from the pick manifold;

wherein the operation of the plurality of pick arm struts connects the transfer pad either with the wick when the plurality of pick manifold struts hold the transfer pad away from the pick manifold or with the rolling paper segment when the plurality of pick manifold struts hold the transfer pad adjacent to the pick manifold;

wherein the operation of both the plurality of pick arm struts and the plurality of pick manifold struts connect the transfer pad with the wick to transfer adhesive from the wick to the transfer pad, which adhesive can then by operation of both the plurality of pick arm struts and the plurality of pick manifold struts be applied by the transfer pad to the rolling paper segment.

\* \* \* \* \*